(12) United States Patent
Huacuja

(10) Patent No.: US 12,721,479 B2
(45) **Date of Patent: *Sep. 1, 2026**

(54) APPARATUS FOR UNMOLDING, SLICING, SERVING, REFRIGERATING AND TRANSPORTING FLANS

(71) Applicant: Rafael Huacuja, Laredo, TX (US)

(72) Inventor: Rafael Huacuja, Laredo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/403,681

(22) Filed: Nov. 28, 2025

(65) Prior Publication Data

US 2026/0083283 A1 Mar. 26, 2026

Related U.S. Application Data

(63) Continuation-in-part of application No. 18/671,796, filed on May 22, 2024, now Pat. No. 12,648,674.

(60) Provisional application No. 63/453,845, filed on Mar. 22, 2023.

(51) Int. Cl.

| | |
|---|---|
| ***B26D 3/24*** | (2006.01) |
| ***A47J 47/02*** | (2006.01) |
| ***A47J 47/14*** | (2006.01) |

(52) U.S. Cl.

CPC ............... *A47J 47/02* (2013.01); *A47J 47/14* (2013.01)

(58) Field of Classification Search

CPC ... B26D 3/24; A47J 37/01; A47J 27/04; A47J 27/05; A47J 36/02; A21B 3/137; A21B 3/135; A21B 3/13; A21B 3/133; A21B 3/131; B65D 85/36

USPC ........ 99/413, DIG. 15, 426; 220/573.1, 506, 220/273.4, 23.83, 23.87; 249/DIG. 1

See application file for complete search history.

(56) References Cited

U.S. PATENT DOCUMENTS

| | | | | |
|---|---|---|---|---|
| 4,865,219 A * | 9/1989 | Logan | A47G 19/08 | 206/557 |
| 5,537,917 A * | 7/1996 | Schiffer | A21B 3/13 | 249/DIG. 1 |
| 5,678,475 A * | 10/1997 | Villar Otero | A21B 3/137 | 249/DIG. 1 |
| 2004/0216620 A1* | 11/2004 | Quiggins | A47J 36/08 | 99/413 |
| 2014/0290069 A1* | 10/2014 | White, III | B26D 3/24 | 30/114 |

* cited by examiner

*Primary Examiner* — King M Chu

(74) *Attorney, Agent, or Firm* — Daniel Polk

(57) ABSTRACT

An apparatus is provided for demolding, slicing, serving, storing, and transporting a food product such as a flan or other food products. The apparatus includes a tray or plate having at least one peripheral guide wall configured to receive a solid portion of the food product and a first portion of liquid, and a ring-shaped restraining component that stabilizes the solid portion during storing or handling. A container positioned beneath the tray collects excess liquid, and a lid encloses the assembly for storage or transport. In some embodiments, the tray and plate are fused together as a single molded component. The apparatus may be disposable, semi reusable, or non-disposable and may include spill sections and guide walls that align a cutting instrument to produce uniform slices while maintaining product stability and presentation quality.

6 Claims, 27 Drawing Sheets

APPARATUS FOR UNMOLDING, SLICING, SERVING, REFRIGERATING AND TRANSPORTING FLANS

CROSS REFERENCE

This application is a continuation in part of US Application No. Ser. No. 18/671,796, filed in the U.S. Receiving Office on May 22, 2024, which claims the benefit of U.S. Provisional Application No. 63/453,845, filed Mar. 22, 2023.

BACKGROUND

The present invention focuses on an apparatus for unmolding, cutting, serving, refrigerating and transporting flans or other food products.

When the flan is ready to be unmolded, a knife is generally used to separate it from the edge of the mold; then a plate is placed over the mold and the mold is flipped upside down. Usually, liquid caramel first begins to run through the gap formed when separating the flan from the mold. The flan then detaches from the mold and descends onto the plate along with the rest of the liquid caramel.

The containers currently used to unmold and handle flans do not separate the caramel from the flan, nor do they keep the flan fixed in one place. Flans rest in a puddle of caramel, which after some time harms their coloration. In current containers, flans are jostled as they slide from side to side, and it is also difficult to cut slices of the same size and serve them without damaging their presentation.

Observing the need to separate most of the liquid caramel from the flan and store it, to keep the dessert fixed within its container, and to make cutting, serving, refrigerating, and transportation easier, an apparatus that can either be non disposable, semi-reusable or disposable was devised to solve all of these drawbacks.

SUMMARY

This invention is specialized for food products like flan, making it easier to unmold, slice, serve, store, and transport them without making a mess. It uses a combination of parts, a tray or plate with raised guide-walls, a ring that fits around the dessert to hold it in place, a container underneath to catch excess liquid (like caramel), and a lid that seals everything for storage or transport.

The guide-walls can help the user cut the dessert into equal portions, while spill sections and rims are designed to let extra caramel drain into the container but keep a thin layer around the dessert to maintain moisture. The tray snaps on or locks to the container so the assembly is stable during cutting or moving, and the ring and lid help protect the dessert during refrigeration or travel. The invention is provided in both a sturdy, reusable version and a disposable or semi-reusable version that can partially be thermoformed for low-cost production.

DETAILED DESCRIPTION OF THE INVENTION

Figure 1:
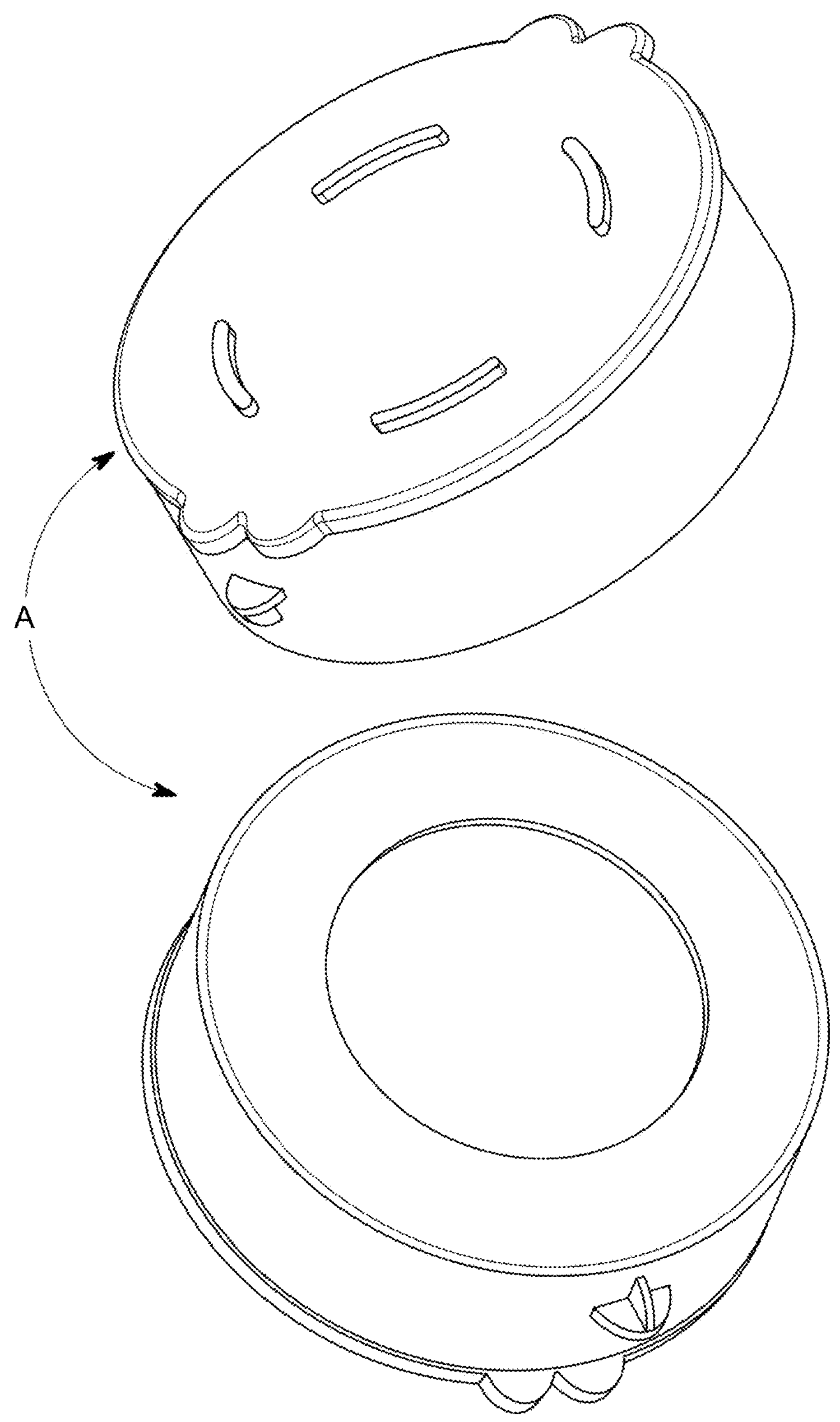
FIG. 1 is a top lateral perspective, and a bottom lateral perspective of the non-disposable apparatus.

Non-disposable apparatus (FIG. 1): A

Figure 2:
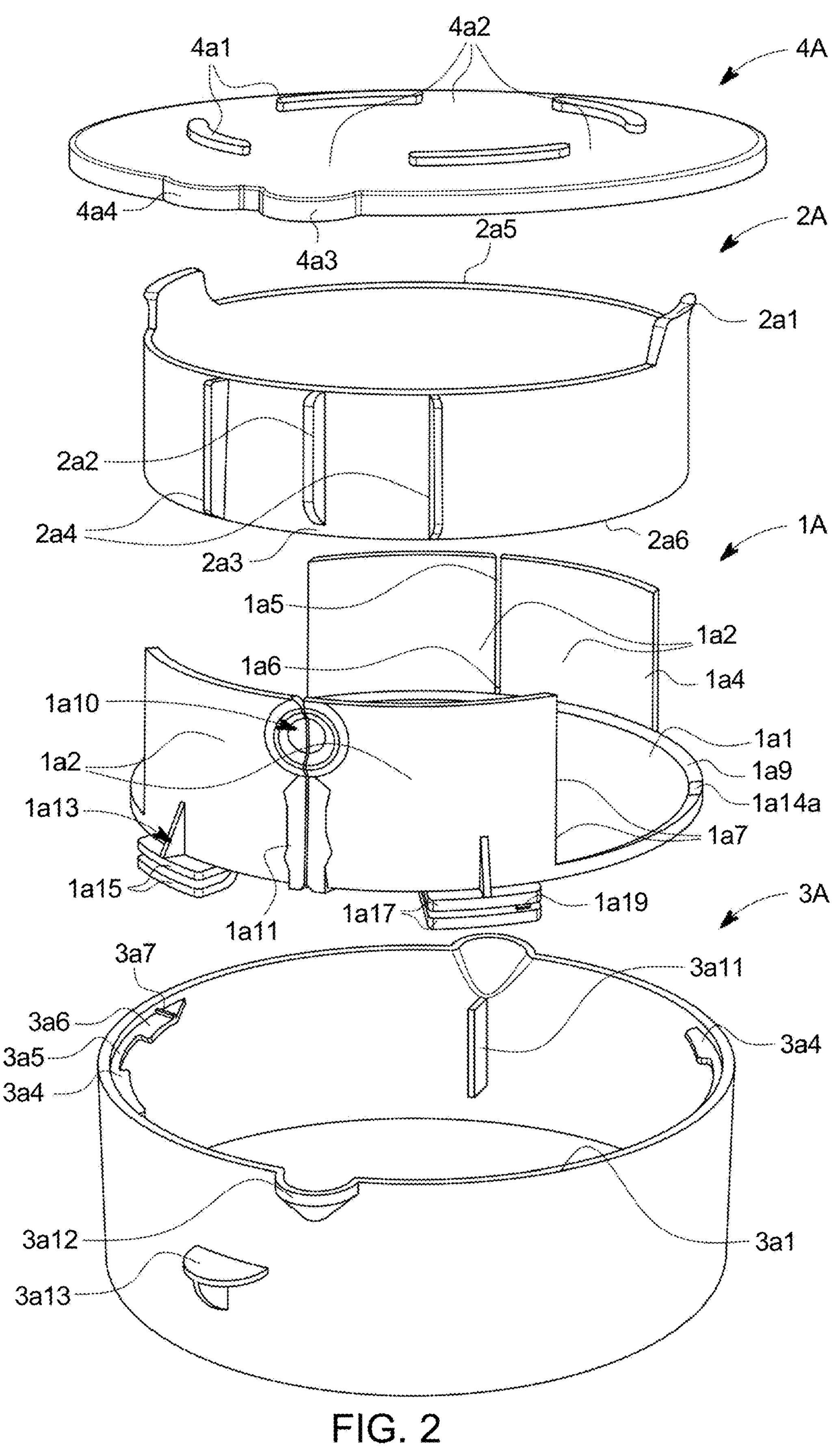
FIG. 2 is a perspective showing the four components that comprise the non-disposable apparatus and their assembly order: lid, ring, tray, and container.
Figure 3:
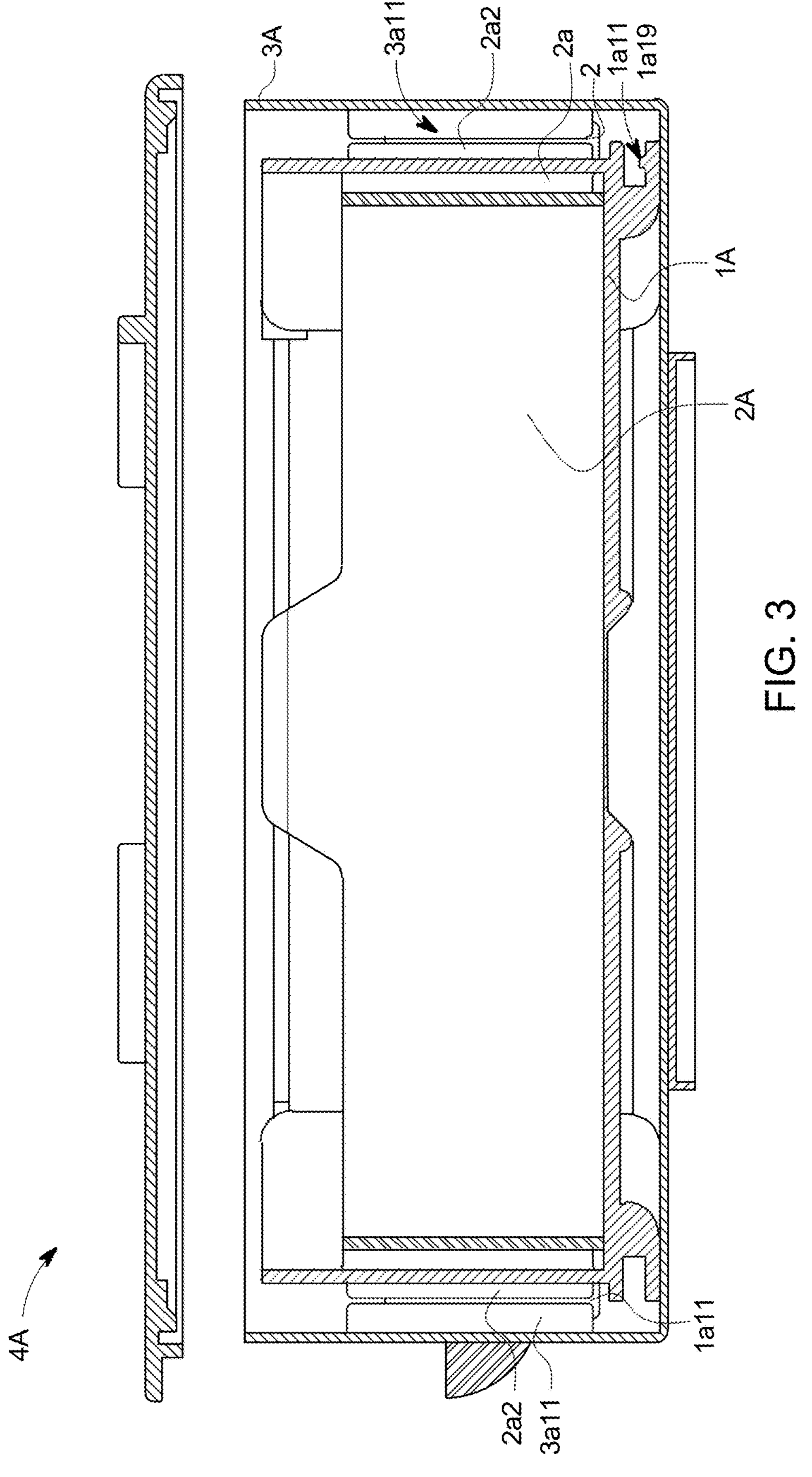
FIG. 3 is a cross-section of the non-disposable apparatus showing the ring assembled to the tray; the tray resting on the bottom of the container, engaged to it; and the lid above those three components.

Non-disposable Tray (FIG. 2): 1A

Figure 4:
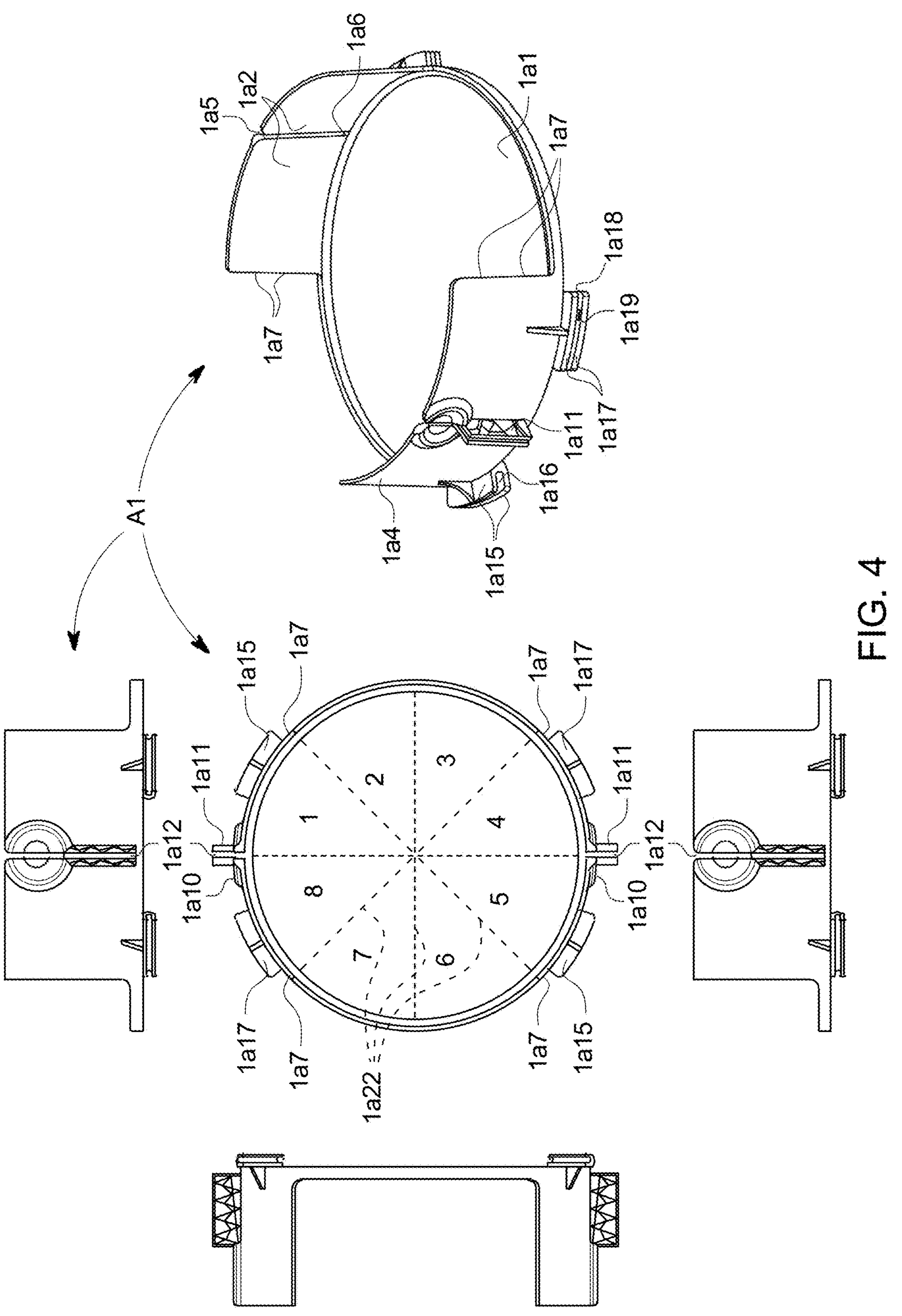
FIG. 4 is a top view of the non-disposable tray showing how the product is cut into eight equal parts; a side perspective of the tray; and three cross-sections of the tray.
Figure 5:
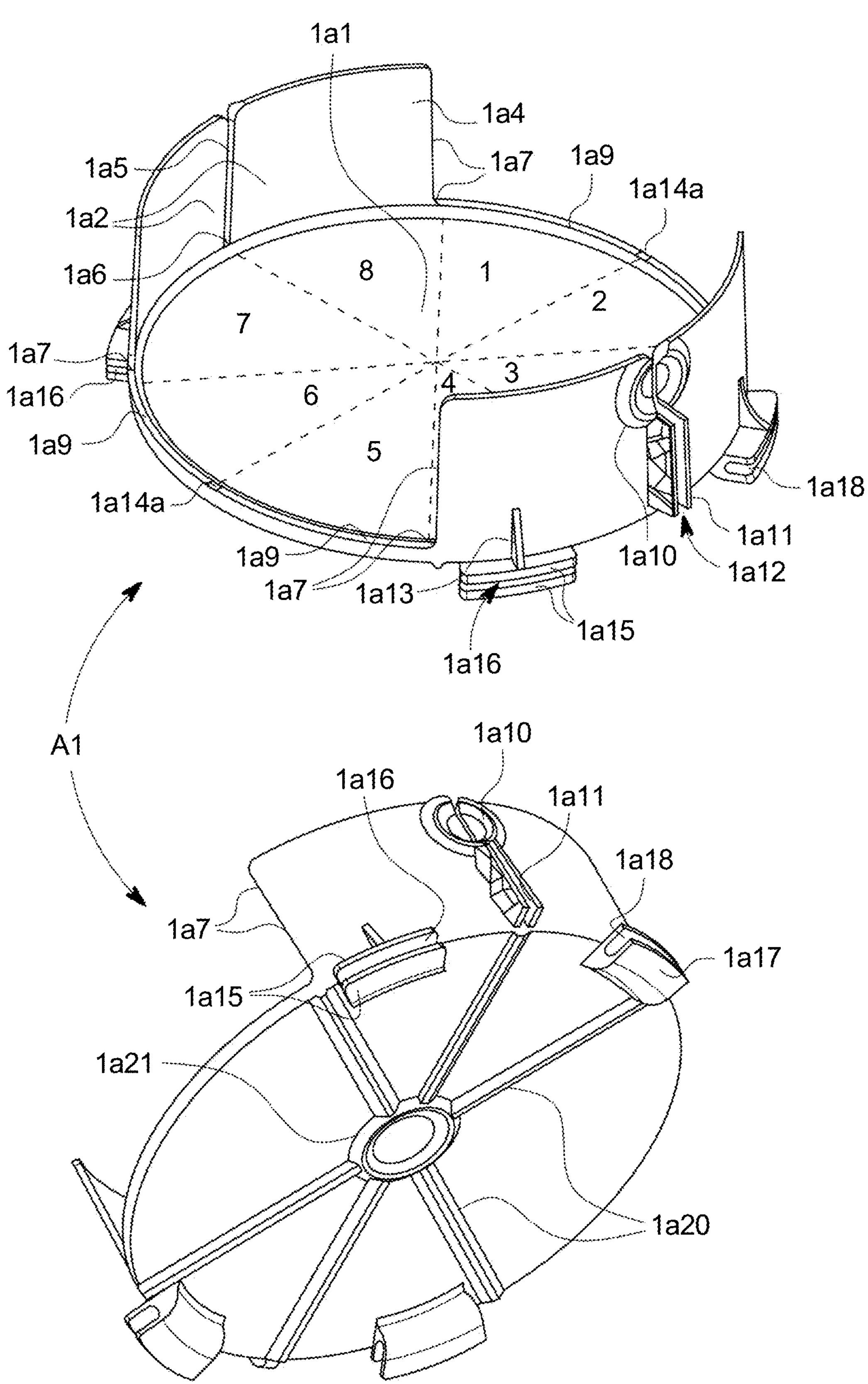
FIG. 5 is an upper perspective, and a lower perspective of the non-disposable tray.
Figure 14:
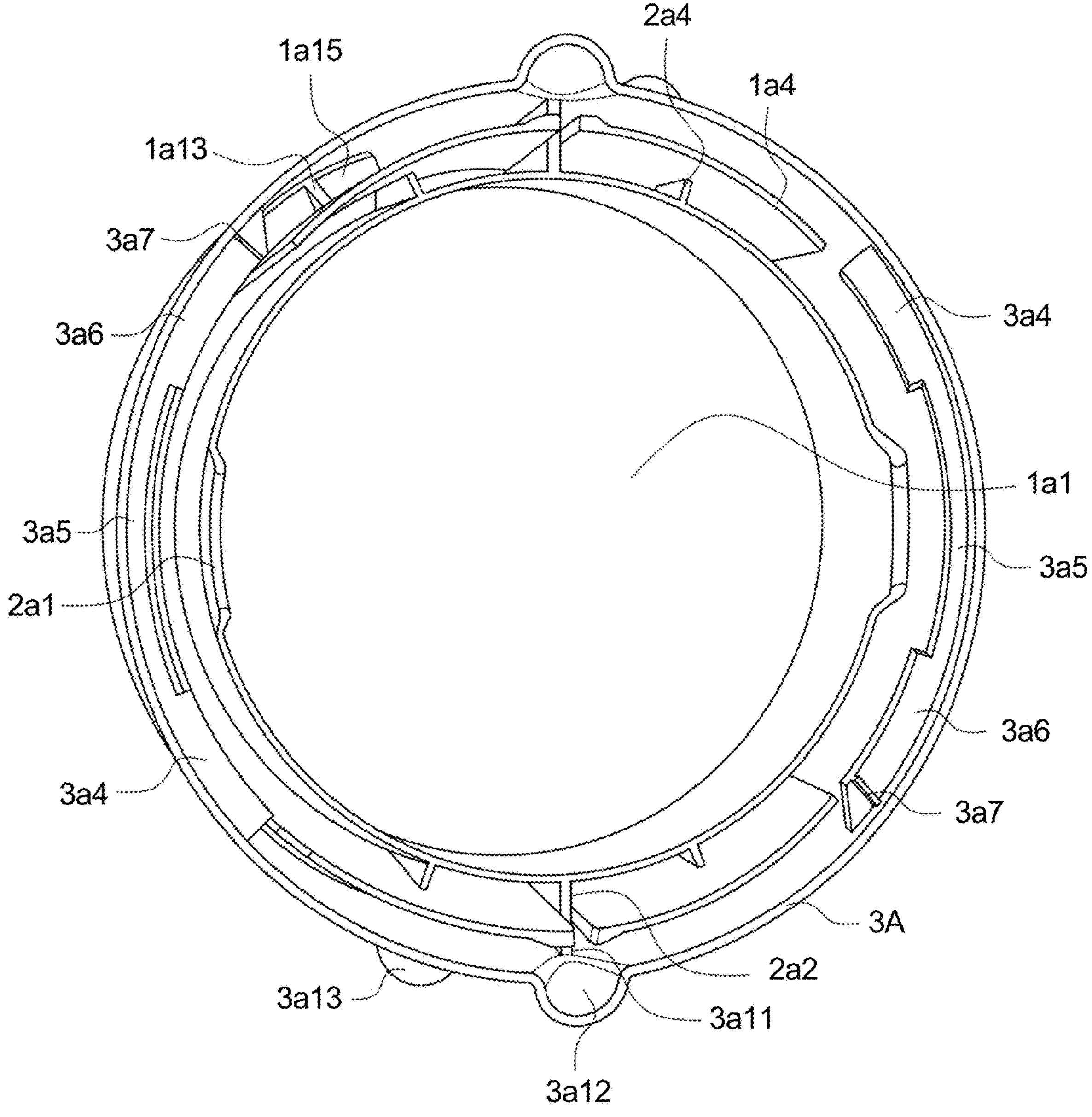
FIG. 14 is a top view of the non-disposable model that shows the ring resting on the tray and fastened to it, while the tray rests on the bottom of the container and is engaged to it.

Tray's surface where product rests (FIGS. 2, 4, 14): 1*a*1

Tray's guide-wall, includes both (1*a*4) sections (FIGS. 2, 4, 5, 13): 1*a*2

Figure 12:
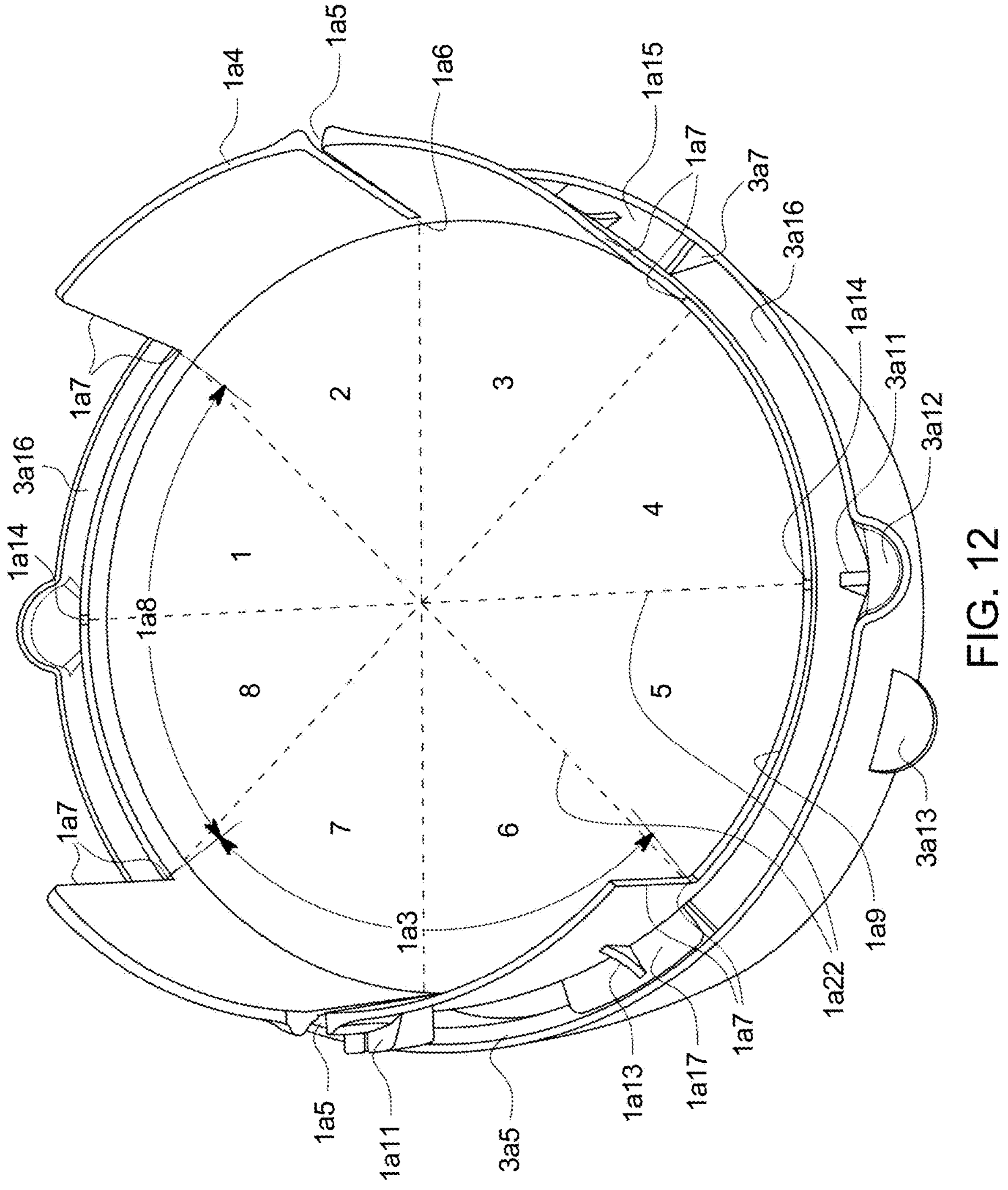
FIG. 12 is a perspective of the non-disposable tray mounted and attached to the container, indicating how the tray's design allows the product to be sliced into equal parts.
Figure 13:
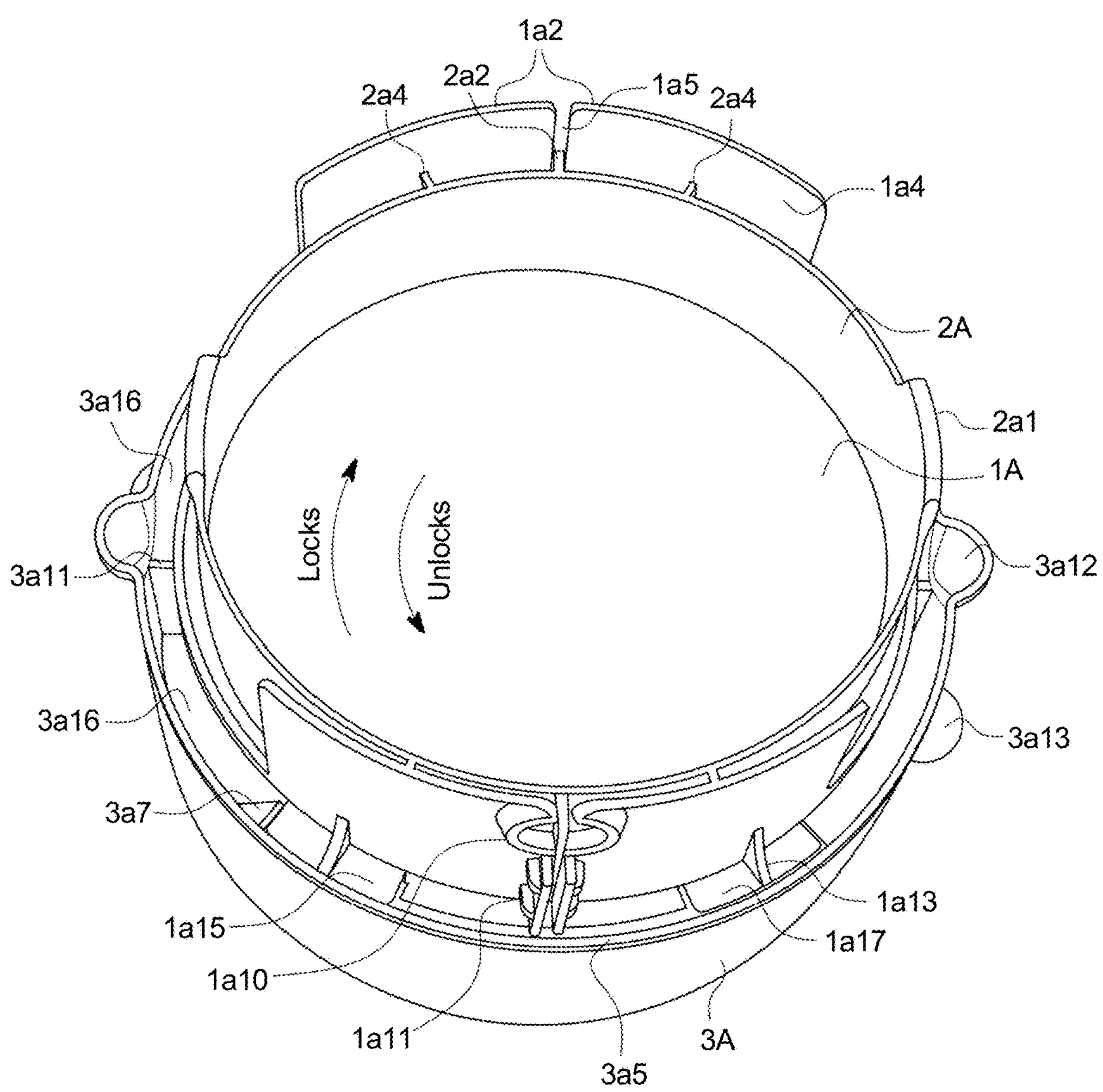
FIG. 13 is a perspective showing the ring fastened to the tray, and the tray mounted on and secured to the non-disposable container.

Guide-wall shorter arc "quadrants" (FIG. 12): 1*a*3

Guide-wall section (FIGS. 2, 12,13): 1*a*4

Gap (passway) at guide-walls center (FIGS. 2, 12, 13): 1*a*5

Rim below wall gap (FIGS. 2, 5, 12): 1*a*6

Guide-walls slicing alignment edges (FIGS. 4, 5, 12): 1*a*7

Spill arcs with larger quadrants (FIG. 12): 1*a*8

Spill retention rim (FIGS. 2, 5, 12): 1*a*9

Ergonomic lifter (FIGS. 2, 5, 13): 1*a*10

Ergonomic rotator configured by two parallel vertical flanges (FIGS. 2, 5, 13): 1*a*11

Gap between ergonomic rotator (FIGS. 2, 4, 5): 1*a*12

Guide-wall sections exterior reinforcements (FIGS. 2, 5, 12): 1*a*13

Aligning points at center of spill rims (FIGS. 2, 5, 12): 1*a*14

Leading flanges (FIGS. 2, 4, 5): 1*a*15

Leading grooves (FIGS. 4, 5): 1*a*16

Locking flanges (FIGS. 2, 4, 5): 1*a*17

Locking grooves (FIGS. 4, 5): 1*a*18

Tray's locking feature (FIGS. 2, 3, 4, 16): 1*a*19

Bottom rod reinforcements (FIG. 5): 1*a*20

Ring shaped bottom reinforcement (FIG. 5): 1*a*21

Dotted slicing guidelines (FIGS. 4, 12): 1*a*22

Non-disposable Ring: 2A

Figure 6:
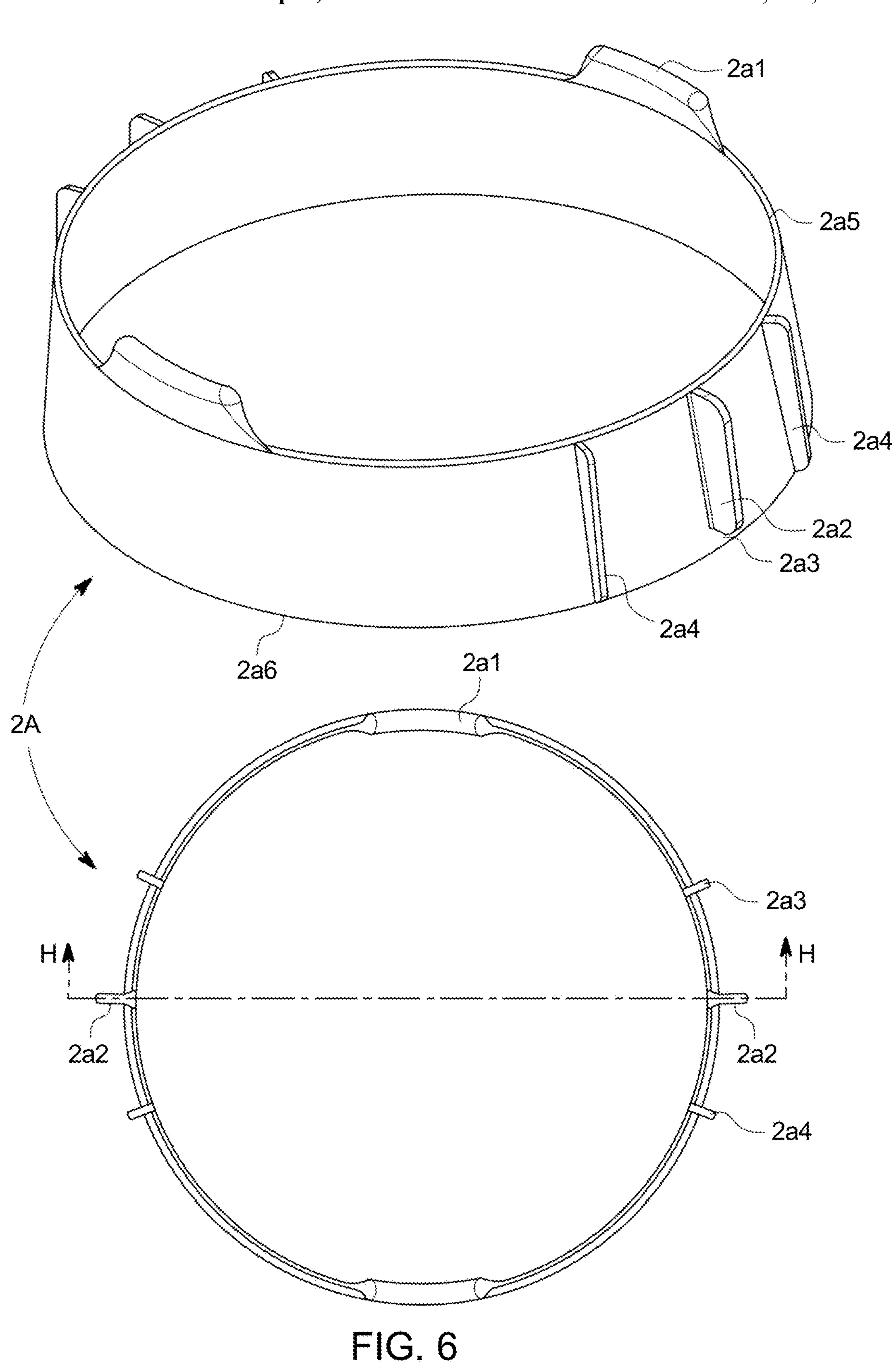
FIG. 6 is a front upper perspective, and a top view of the non-disposable ring.
Figure 7:
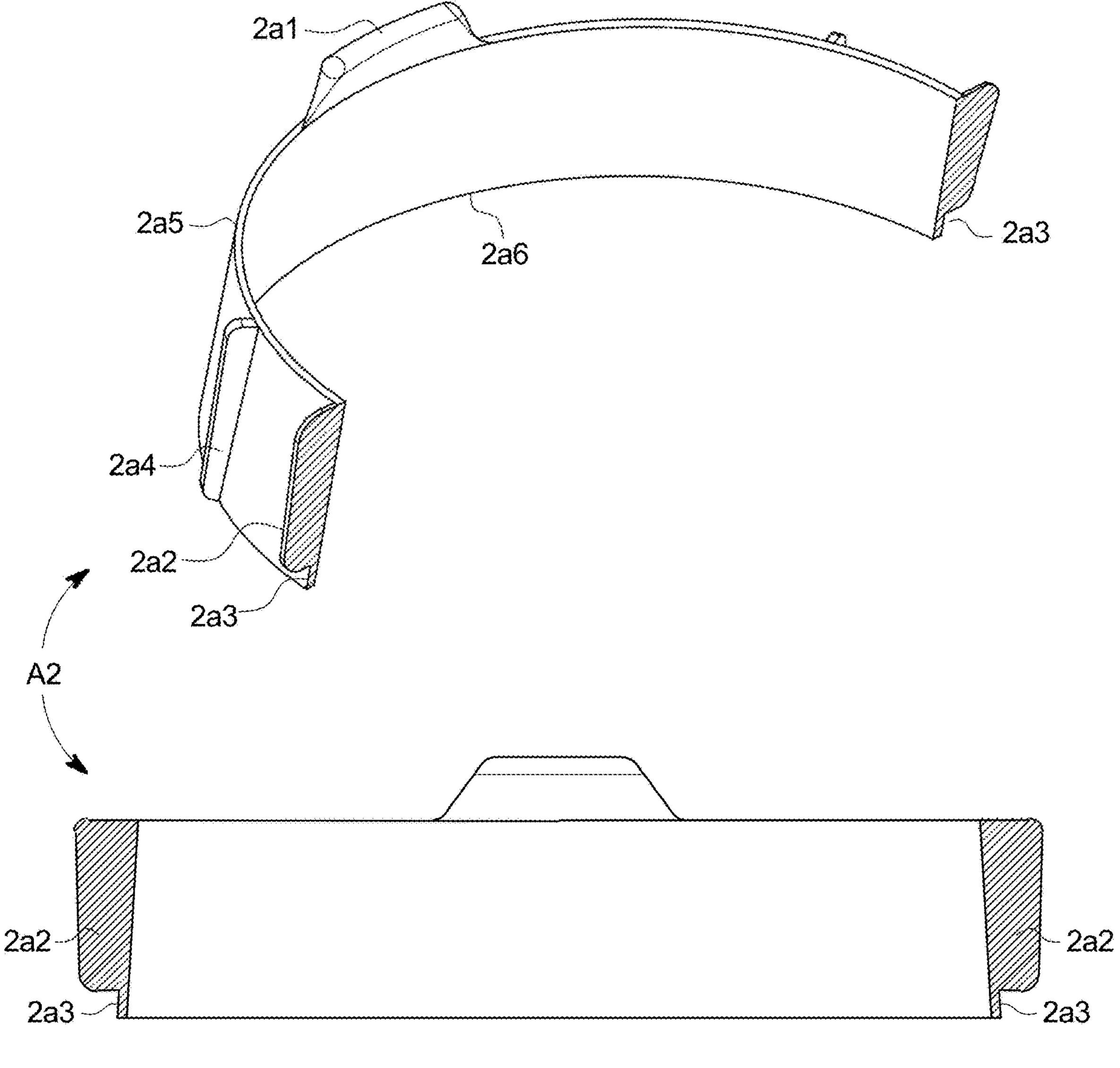
FIG. 7 is a perspective of the non-disposable ring sectioned at the center of the ring's main or central flanges, and a frontal view of the same section.

Ring lifters (FIGS. 6, 7): 2*a*1

Main (central) flanges (FIGS. 6, 7): 2*a*2

Space below main flange (FIGS. 6, 7): 2*a*3

Auxiliary (lateral) flanges (FIGS. 6, 7): 2*a*4

Upper rim (FIGS. 6, 7): 2*a*5

Bottom rim (FIGS. 6, 7): 2*a*6

Non-disposable Container (FIG. 2): 3A

Figure 8:
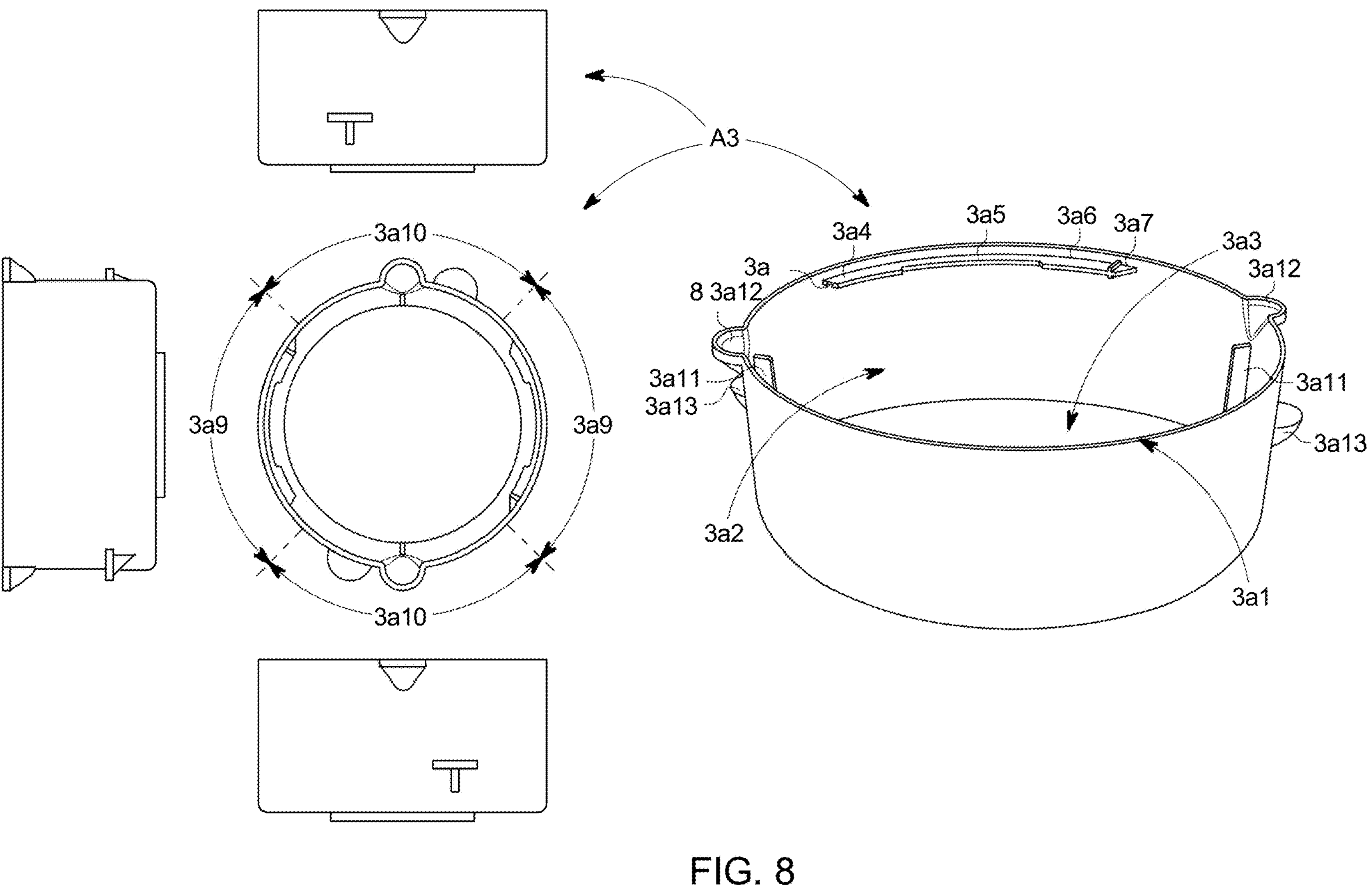
FIG. 8 is a frontal perspective of the non-disposable container, a top view of it, and three side sections.
Figure 9:
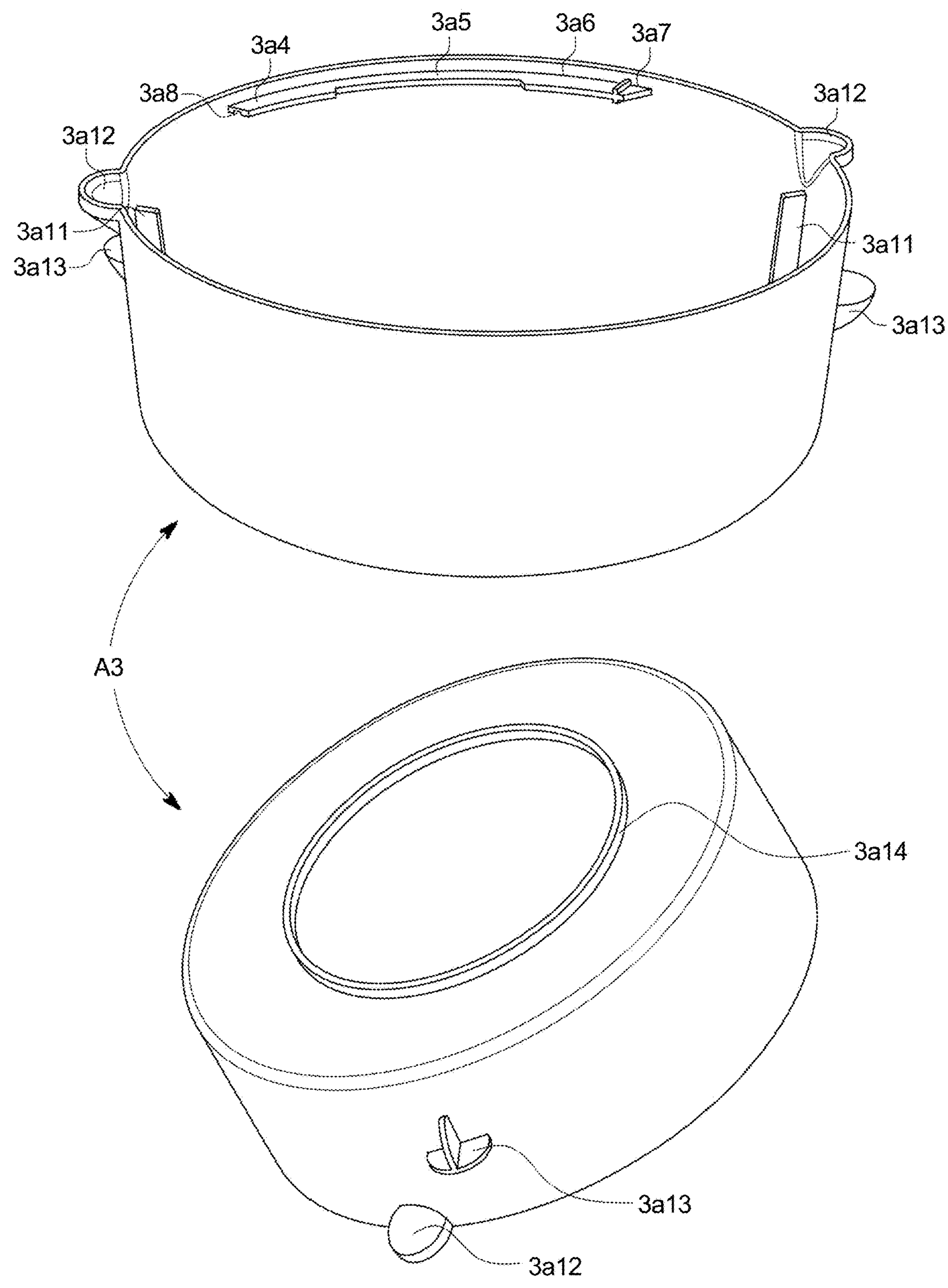
FIG. 9 is an upper-frontal perspective, and a bottom-lateral perspective of the non-disposable container.

Upper rim (FIGS. 8, 9): 3*a*1

Container's interior wall (FIG. 8): 3*a*2

Container's interior bottom (FIG. 8): 3*a*3

Horizontal lock flanges (FIGS. 2, 8, 9): 3*a*4

Rail to connect horizontal lock and rear flanges (FIGS. 2, 8, 9): 3*a*5

Horizontal rear flanges (FIGS. 2, 8, 9): 3*a*6

End-stop fixtures (FIGS. 2, 8, 9): 3*a*7

Groove in which tray's locking feature inserts and locks tray to container (FIGS. 8, 9, 16): 3*a*8

Sections that comprise interior horizontal flanges (FIG. 8): 3*a*9

Sections for lowering and raising the tray (FIG. 8): 3*a*10

Figure 15:
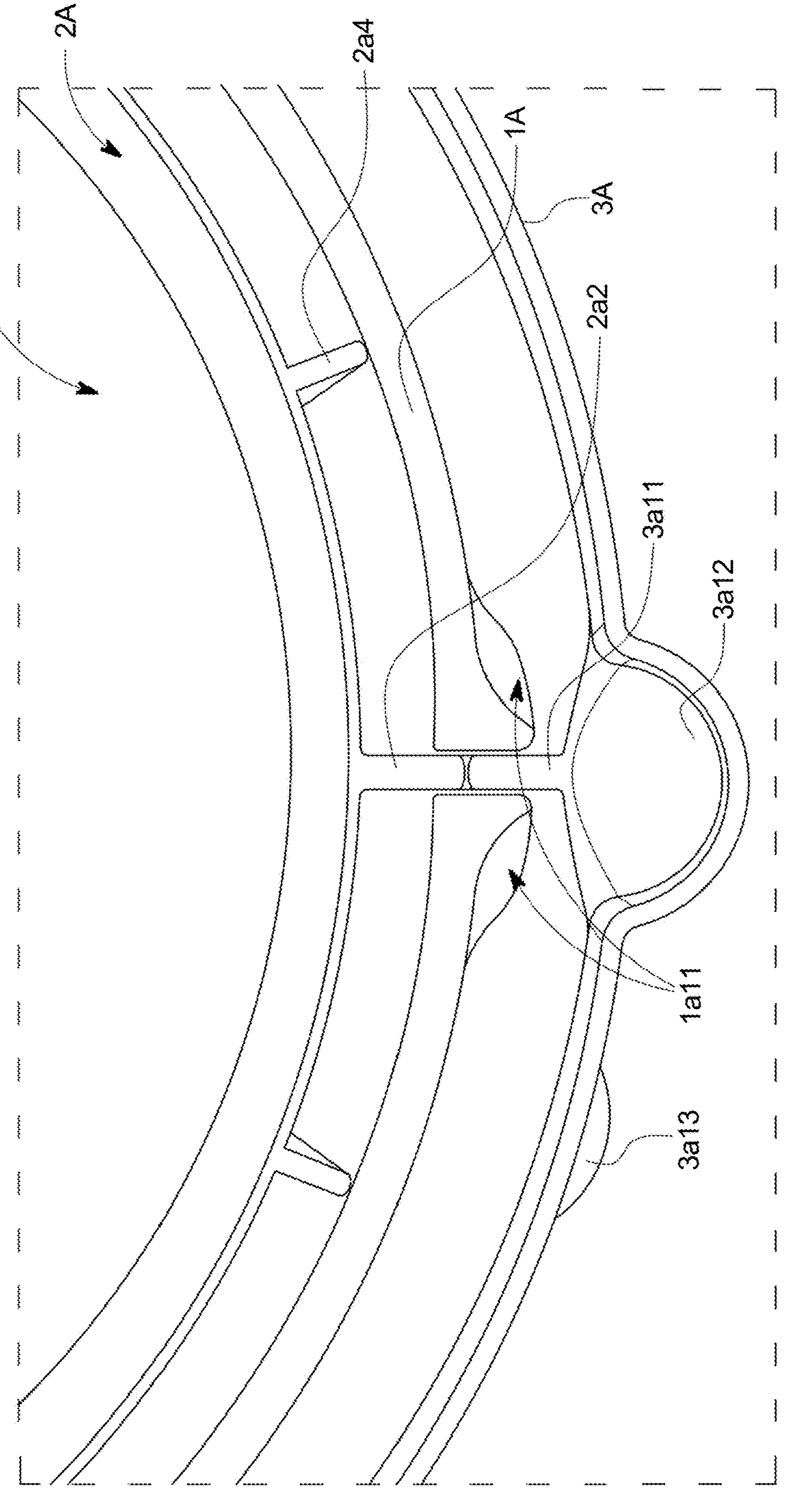
FIG. 15 is a top view enlargement of the non-disposable model that shows how the ring rests on the tray, and is engaged to it; it also shows how the tray rests on the bottom of the container, and is engaged to it.
Figure 16:
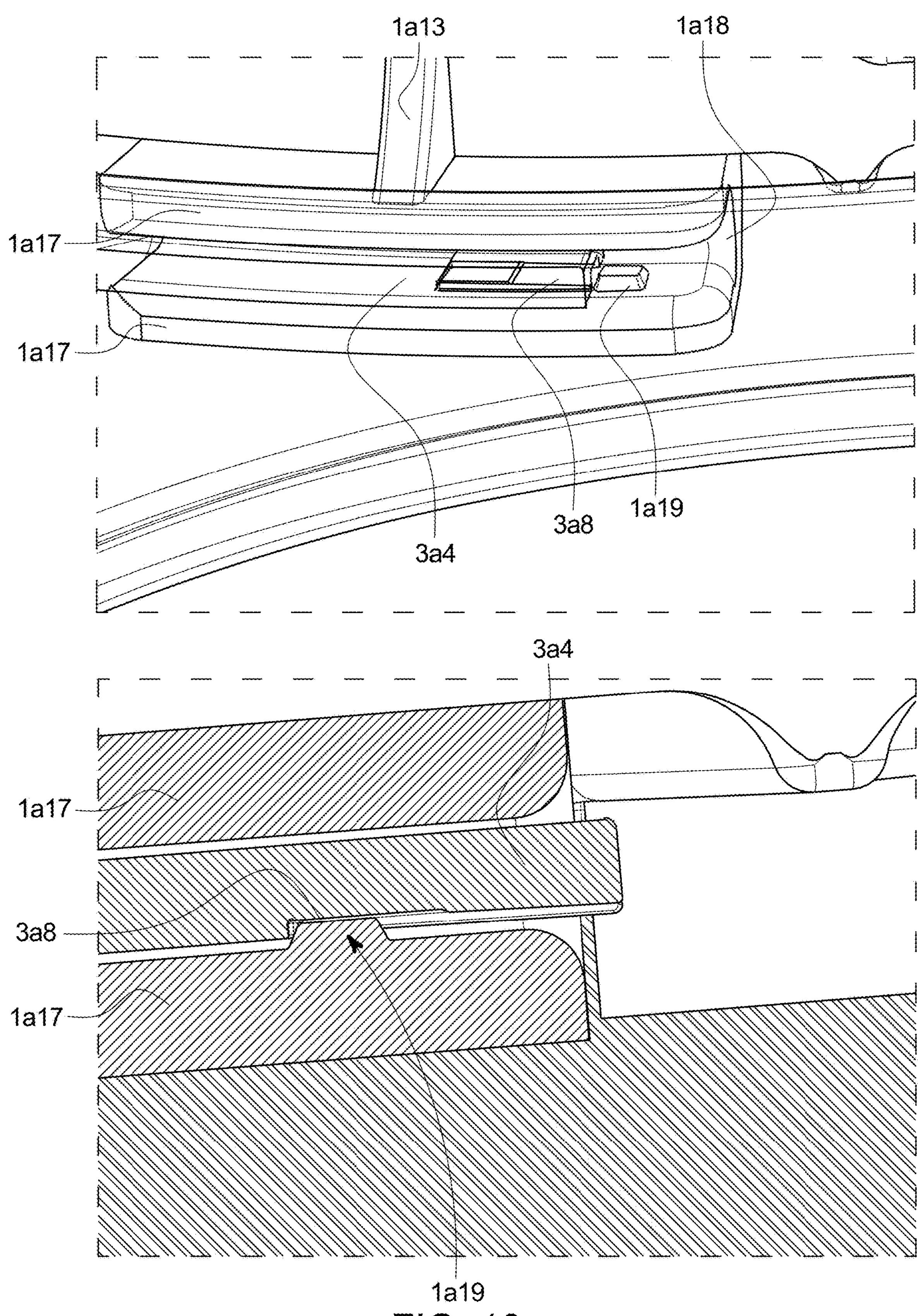
FIG. 16 is a perspective of the non-disposable model showing the mechanism that secures the tray to the container, along with a side section of that same mechanism. This side section details how trays feature 1*a*19 inserts into the notch 3*a*8 located beneath the bottom side of the container's locking flanges 3*a*4.

Interior vertical flanges to lock tray at bottom of container (FIGS. 8, 9, 15): 3*a*11

Access to ring and spill out features (FIGS. 8, 9, 15): 3*a*12

Wing aid opener (FIGS. 9, 14, 15): 3*a*13

Exterior bottom stacking flange (FIG. 9): 3*a*14

Interior horizontal flange spaces (FIG. 8): 3*a*15

Spilling gap between tray and container (FIGS. 12, 13): 3*a*16

Non-disposable Lid (FIG. 2): 4A

Figure 10:
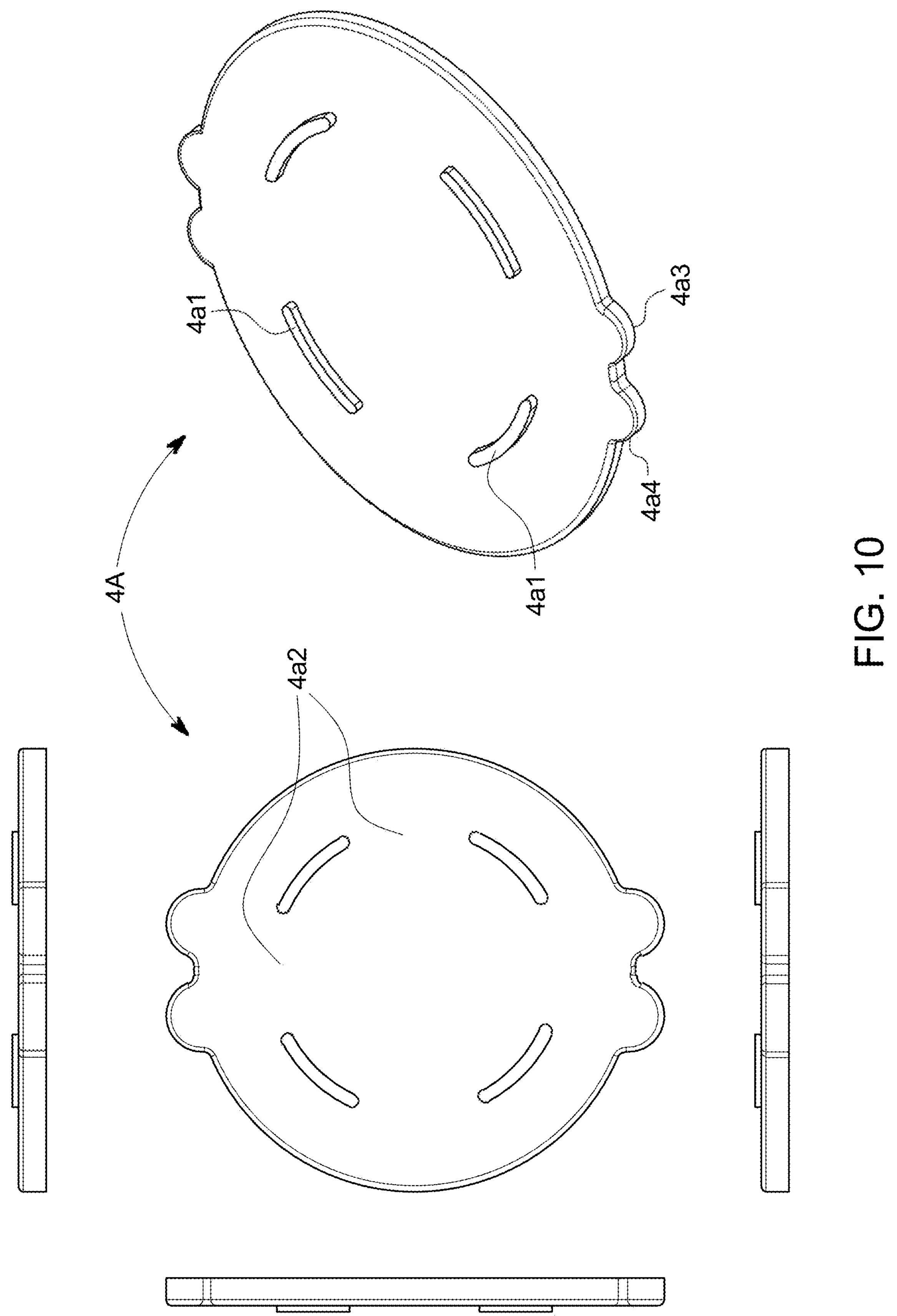
FIG. 10 is a top-lateral perspective, a top view, and three vertical sections of the non-disposable lid.
Figure 11:
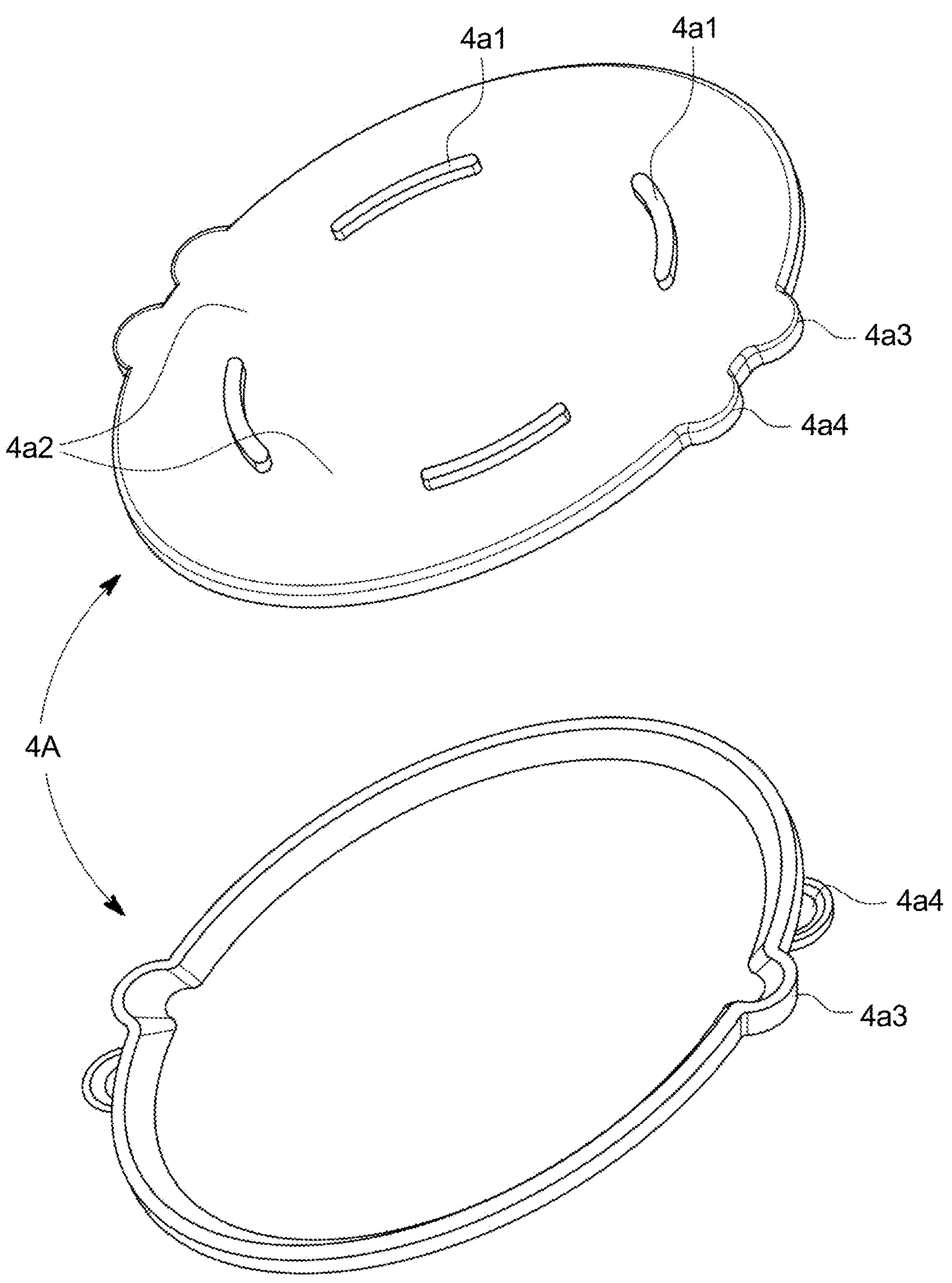
FIG. 11 is a top, and a bottom perspective of the non-disposable lid.

Exterior arc shaped stacking flanges (FIGS. 10, 11): 4*a*1

Spaces to avoid fluid retention (FIGS. 10, 11): 4*a*2

Semicircular adaptations to container's rim (FIGS. 10, 11): 4*a*3

Aid lifting wings (FIGS. 10, 11): 4*a*4

Figure 17:
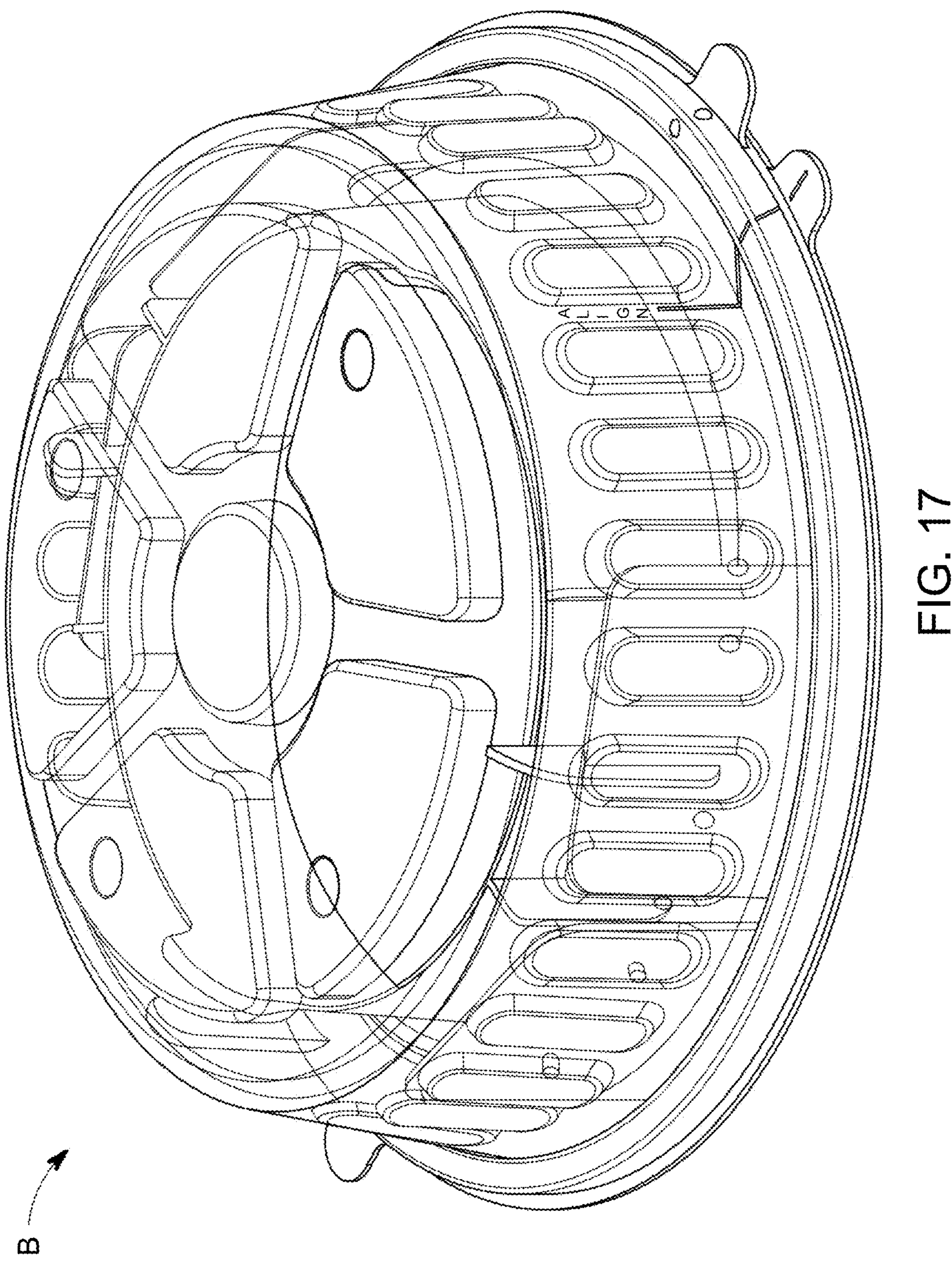
FIG. 17 is an exploded exterior perspective view of the semi-reusable or disposable version.
Figure 18:
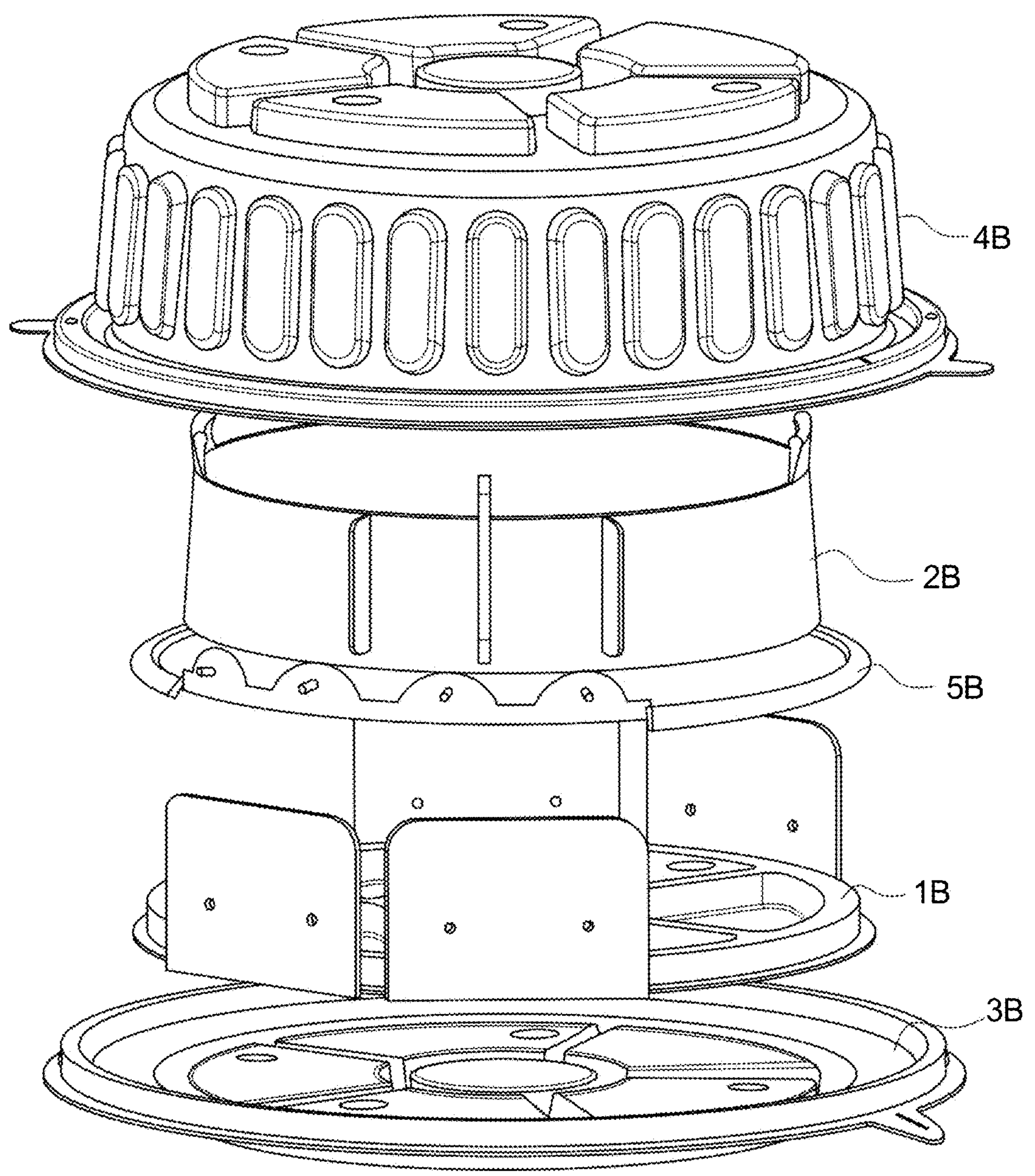
FIG. 18 shows how the five components of this disposable or semi-reusable version assemble.
Figure 19:
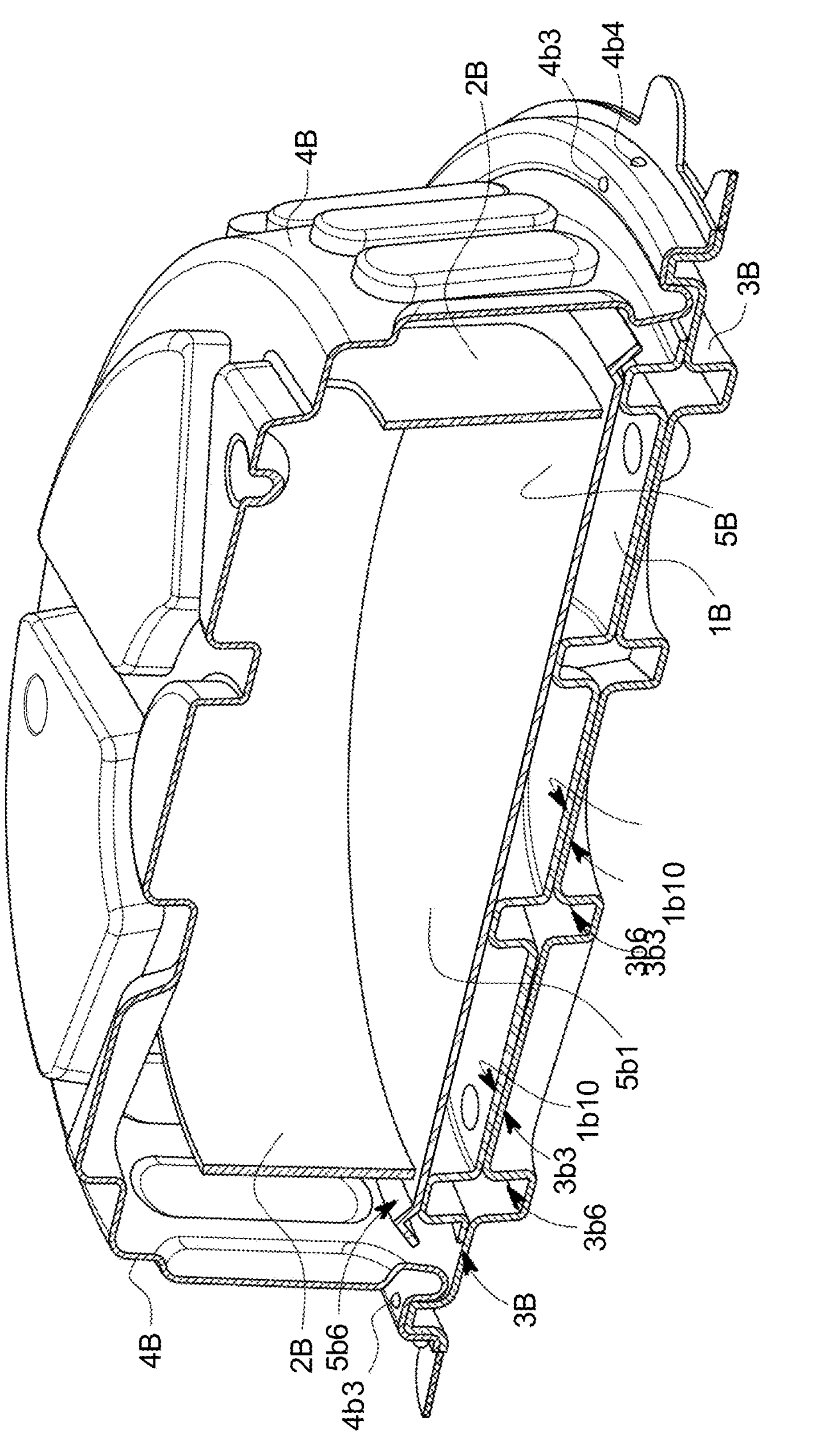
FIG. 19 is a cross-section that shows how the disposable or semi-reusable version assembles.

Disposable or semi-reusable apparatus (containing tray, ring, plate, container and lid) (FIG. 17): B Tray: 1B (FIG. 18)

Figure 20:
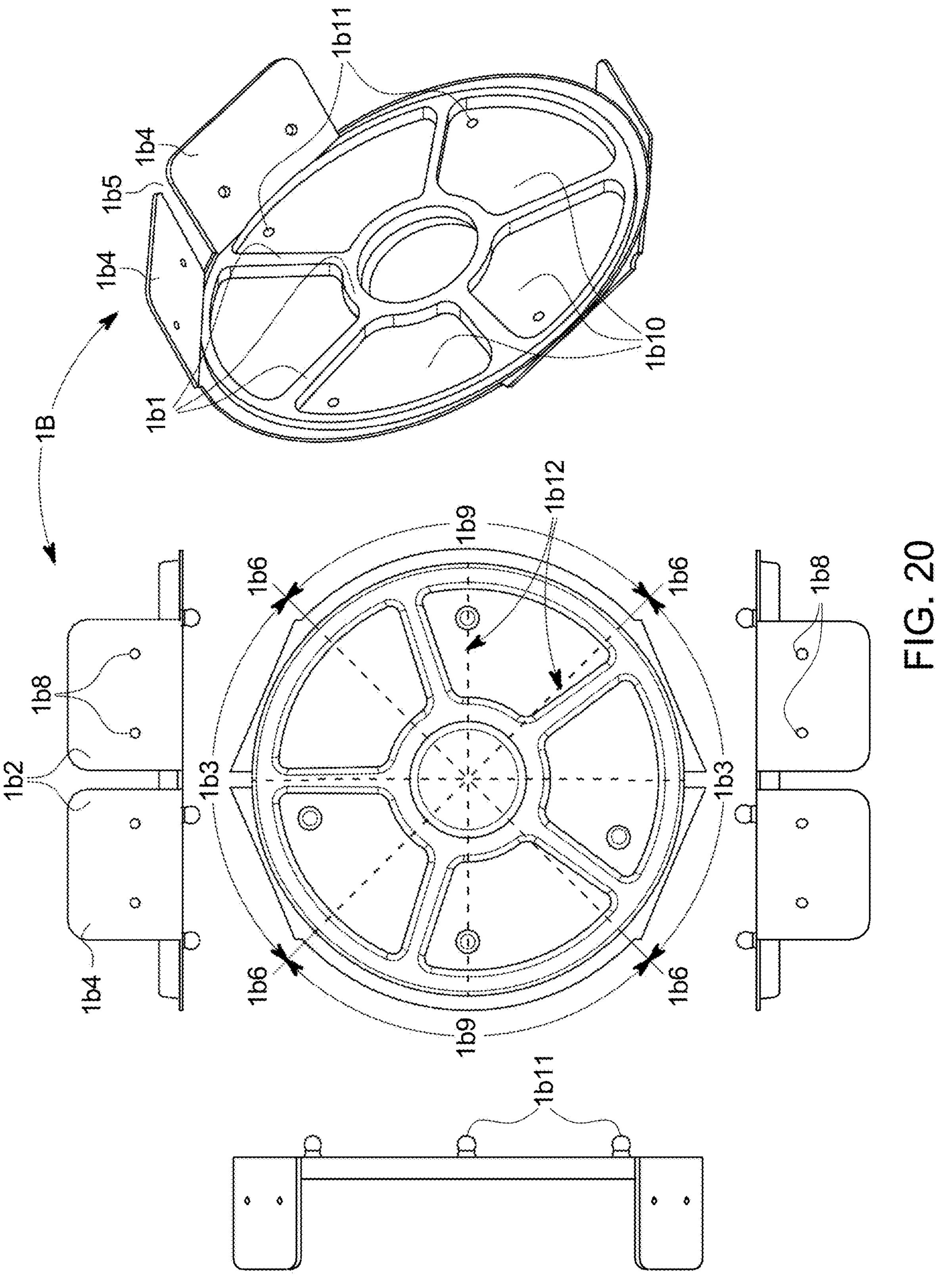
FIG. 20 shows a top view of the disposable or semi-reusable tray illustrating how the product can be cut in two, four or eight exact slices, three lateral sections, and a top lateral view of the same tray.
Figure 21:
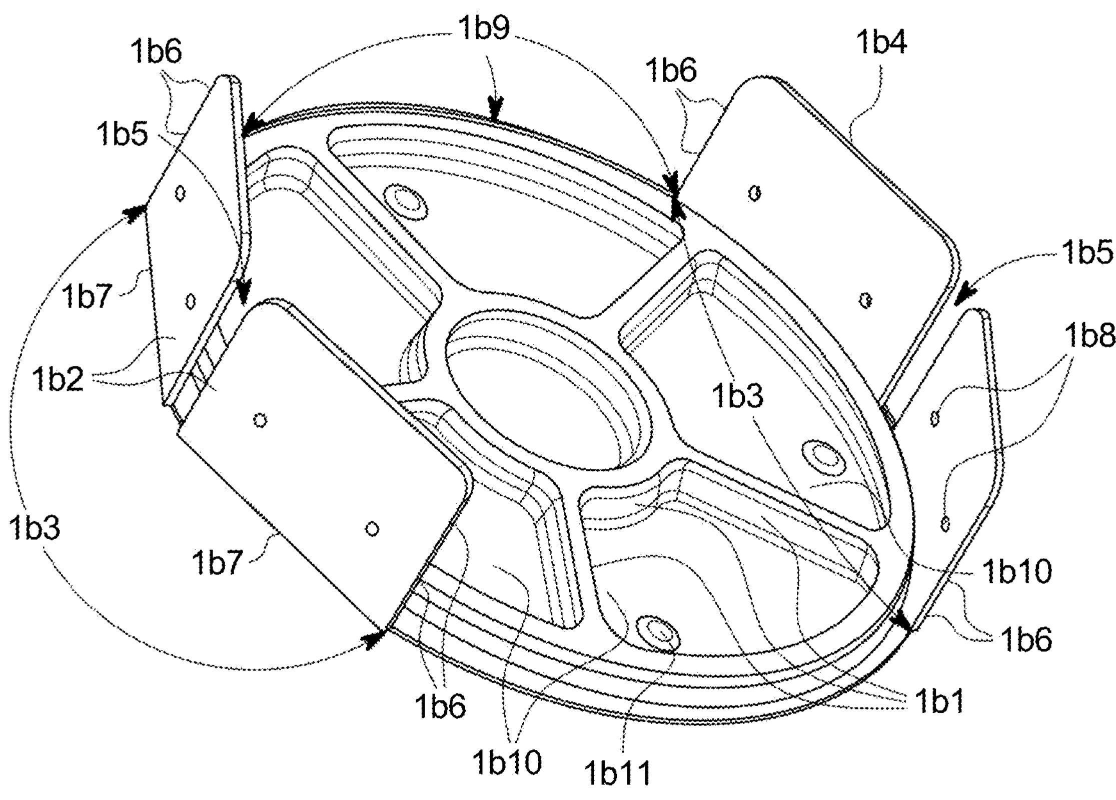
FIG. 21 shows a top perspective view and an elevation of the disposable or semi-reusable tray.
Figure 21:
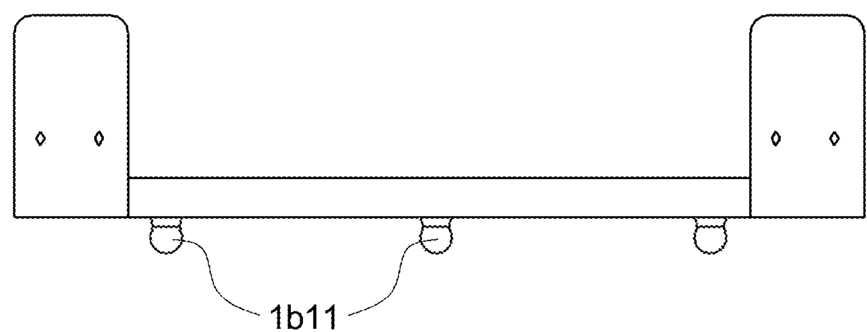

Reinforcements rods, and support surfaces for plate (FIGS. 20, 21): 1*b*1

Guide-walls (FIGS. 20, 21): 1*b*2

Guide-wall arc, or shorter quadrant (FIGS. 20, 21): 1*b*3

Guide-wall section (FIGS. 20, 21): 1*b*4

Vertical gap at center of guide-wall (FIGS. 20, 21): 1*b*5

Guide-wall's slicing alignment edges (FIGS. 20, 21): 1*b*6

Guide-walls sections bending lines (FIG. 21): 1*b*7

Pin holes (FIG. 21): 1*b*8

Larger arc or quadrant that is occupied by the plate's spill section (FIG. 20): 1*b*9

Tray's bottom surfaces that rest on container (FIGS. 20, 21): 1*b*10

Snap-ons to container (FIGS. 20, 21): 1*b*11

Dotted slicing guidelines (FIG. 20): 1*b*12

Ring (FIG. 18): 2B

Figure 24:
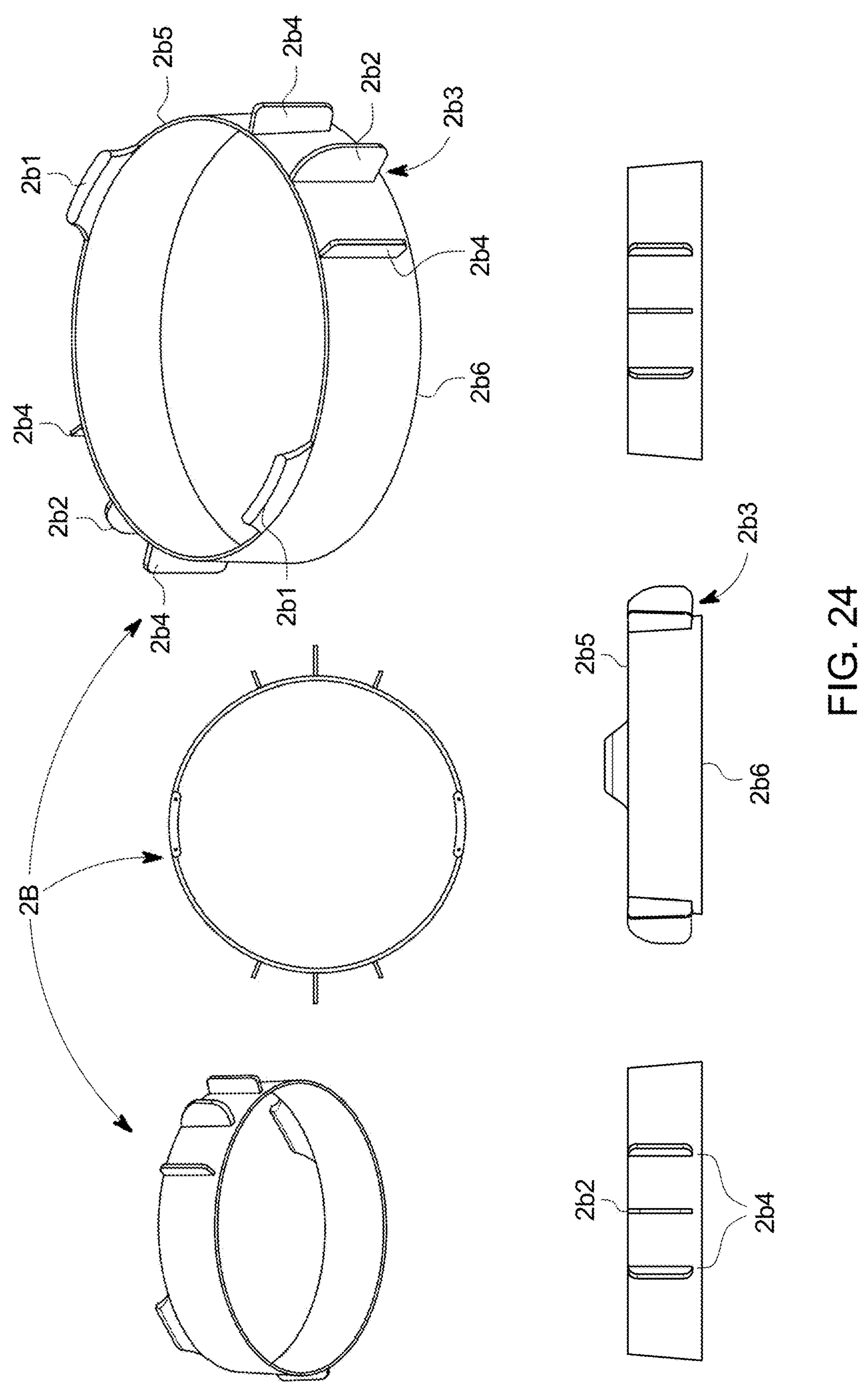
FIG. 24 shows different perspectives and sections of the disposable or semi-reusable ring.

Ring lifters (FIG. 24): 2*b*1

Main or central flanges (FIG. 24): 2*b*2

Space below central flanges (FIG. 24): 2*b*3

Auxiliary or lateral flanges (FIG. 24): 2*b*4

Upper rim (FIG. 24): 2*b*5

Lower rim (FIG. 24): 2*b*6

Container (FIG. 18): 3B

Figure 25:
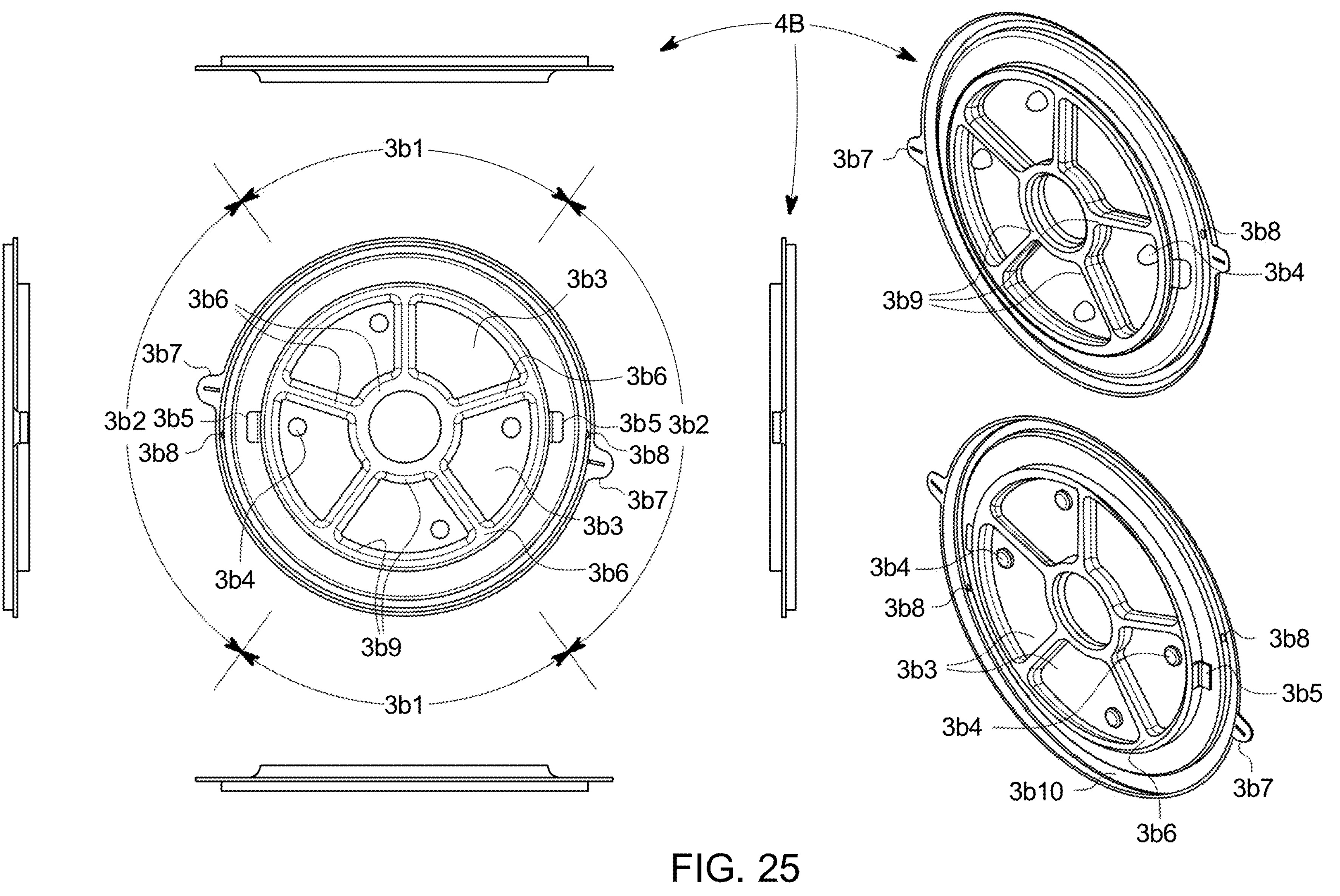
FIG. 25 shows a top view of the disposable or semi reusable container that indicates the arcs where the tray's guide-walls and the spill sections should be positioned, a bottom-lateral and top-lateral view of the same container.

Arc sections corresponding to tray's guide-walls (FIG. 25): 3*b*1

Arc sections corresponding to tray's spillovers (FIG. 25): 3*b*2

Figure 26:
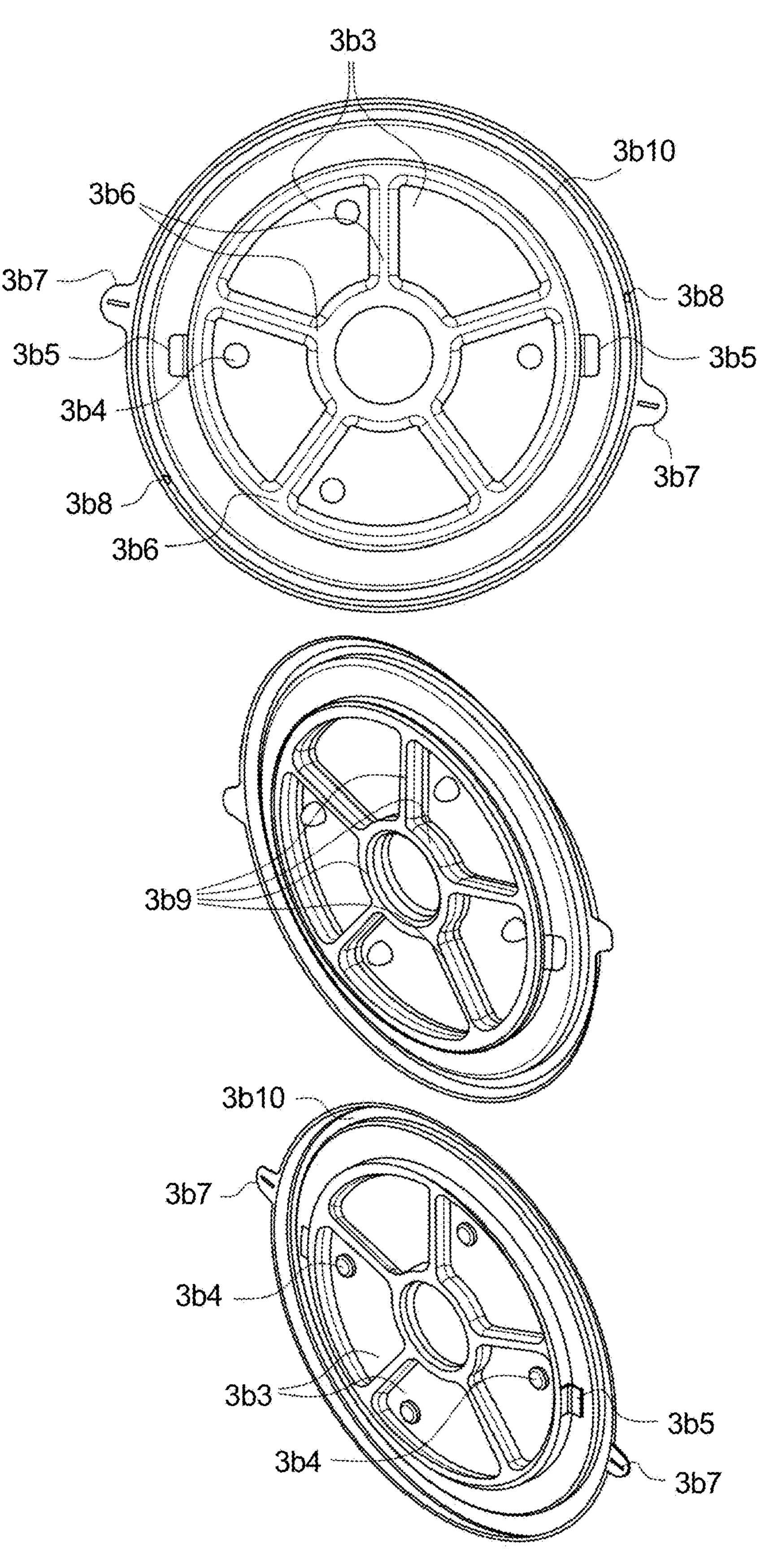
FIG. 26 shows a top view, and bottom and top lateral perspective views of the disposable or semi-reusable container.

Rest surface for tray (FIGS. 25, 26): 3*b*3

Snap-on receptacles (FIGS. 25, 26): 3*b*4

Drain-pour concavities (FIGS. 25, 26): 3*b*5

"U" caramel storage compartments (FIGS. 25, 26): 3*b*6

Wing and mark that serve to align the lid, and as support to separate it (FIGS. 25, 26): 3*b*7

Protruding locking semi-sphere (FIGS. 25, 26): 3*b*8

Bottom stacking pattern (FIGS. 25, 26): 3*b*9

Bottom peripheral groove (FIGS. 25, 26): 3*b*10

Lid (FIG. 18): 4B

Figure 27:
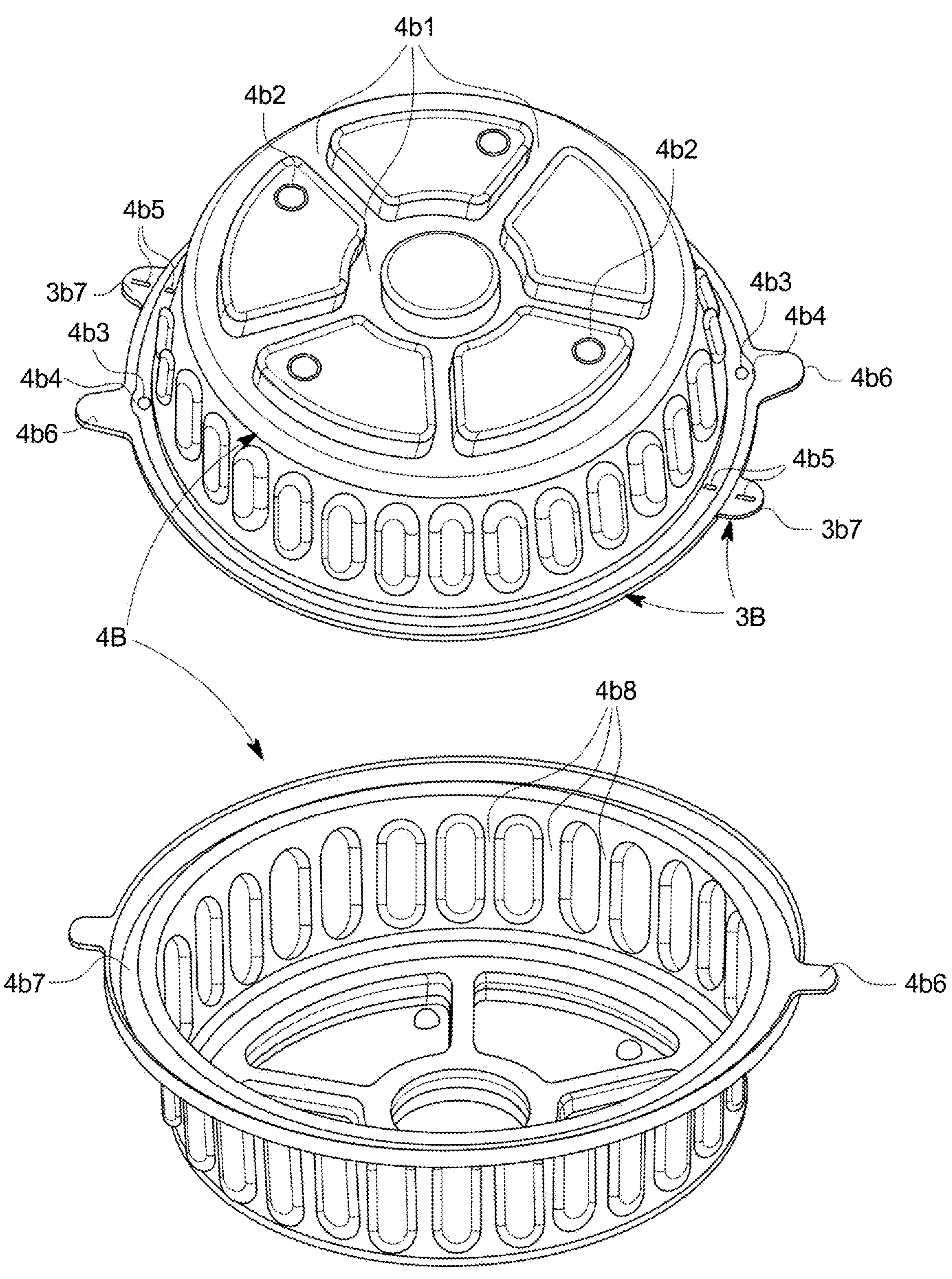
FIG. 27 shows a top exterior perspective of the disposable or semi-reusable lid mounted on the container, and an interior view of the lid.

Stacking grooves (FIG. 27): 4*b*1

Stacking receptacles (FIG. 27): 4*b*2

Press button to attach lid to container (FIG. 27): 4*b*3

Semi-sphere attachment fixture (FIG. 27): 4*b*4

Lid-container alignment lines (FIG. 27): 4*b*5

Lid's wing opener (FIG. 27): 4*b*6

Bottom peripheral rim (FIG. 27): 4*b*7

Interior flat surfaces (FIG. 27): 4*b*8

Plate (see FIG. 18): 5B

Figure 23:
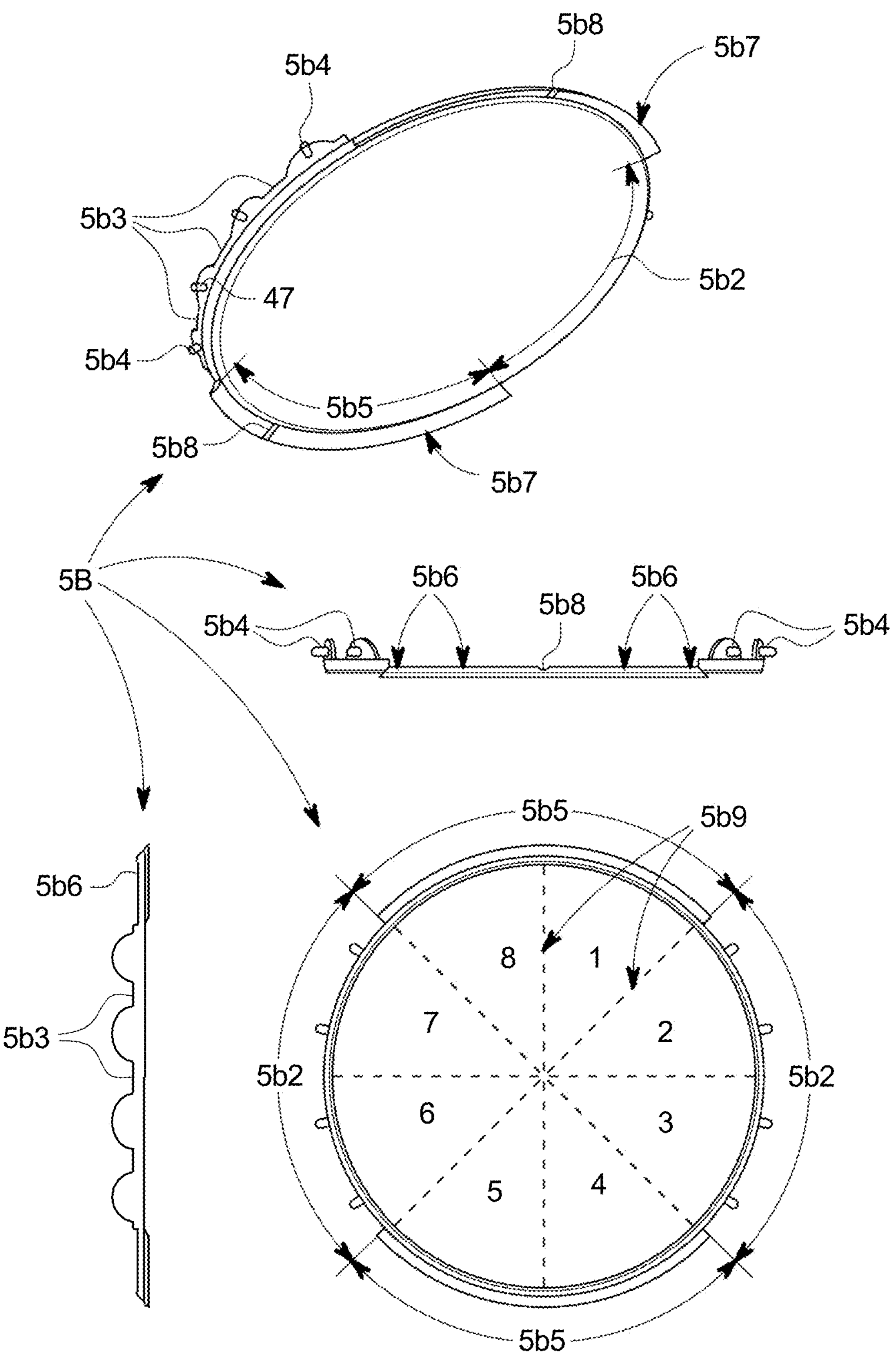
FIG. 23 shows a bottom perspective, a top view that illustrates how the product can be cut in eight equal slices, and two different front view sections of the disposable or semi-reusable plate.

Flat surface where product rests (FIG. 23): 5*b*1

Wall section arc (FIG. 23): 5*b*2

Wall section rim (FIG. 23): 5*b*3

Figure 22:
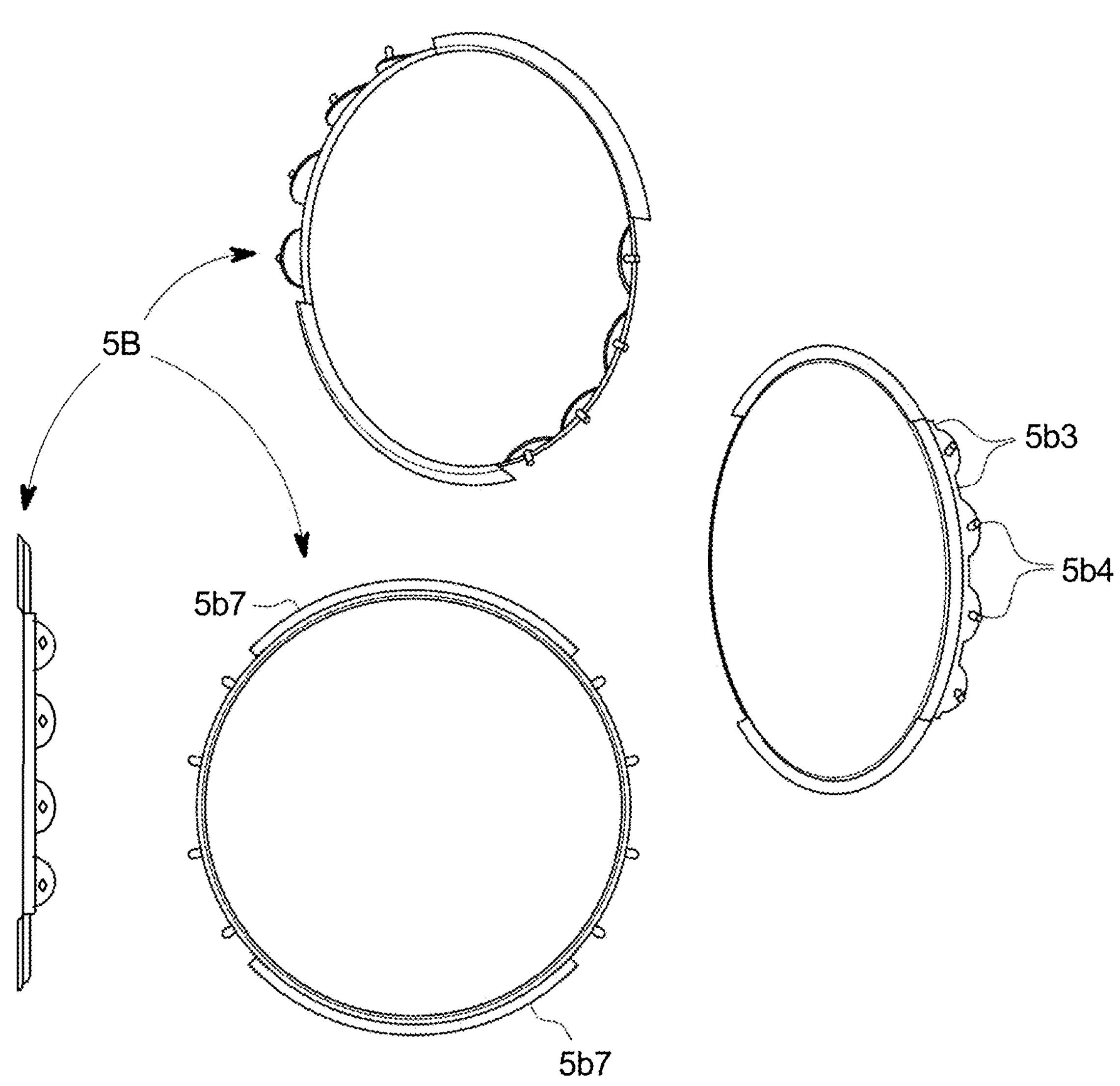
FIG. 22 shows a top lateral perspective, a bottom lateral perspective, a top view, and a lateral section of the disposable or semi-reusable plate.

Snap-on pins (FIGS. 22, 23): 5*b*4

Spillover arc sections (FIG. 23): 5*b*5

Spillover retention rim (FIG. 23): 5*b*6

Spillover edge (FIG. 23): 5*b*7

Spill sections aligning marks (FIG. 23): 5*b*8

Dotted slicing guidelines (FIG. 23): 5*b*9

In some embodiments the non-disposable apparatus comprises four components: a circular tray (1A), a cylindrical ring (2A), the container (3A), and a lid (4A). The tray (1A) is divided into four circular arcs. Two of them (opposite each other) are slightly shorter than the other two, which are also similar to each other and opposite; this compensates for the thickness of the knife used to cut the product. Along the shorter arc (1*a*3), a "guide-wall" (1*a*2) rises perpendicularly. This guide wall is divided into two sections of the same size (1*a*4) by a space (1*a*5) that runs from top to bottom.

In some embodiments, the guide walls (1*a*2) may perform one or more of the following functions:

(a) they assist in aligning a mold containing a flan or similar product with the tray (1A) during unmolding;
(b) they serve as a cutting guide;
(c) the vertical slots (1*a*5) at the center of the guide-walls (1*a*2) combined with the vertical flanges that configure the rotator
(d) (1*a*11) hold the ring (2A) in place around the flan or product.

Adjacent to the arcs of the guide walls (1*a*3), one or more spill arcs (1*a*8) may be provided to allow user access to flan slices or other products. Along the arcs that form the spillway (1*a*8), a small edge (1*a*9) may retain a portion of liquid caramel while allowing excess caramel to drain into the container (3A). Retaining a small portion of caramel in contact with the flan may help prevent drying and sticking to the tray.

In some embodiments, small alignment marks (1*a*14) may be located at the center of the spill edges to facilitate even cutting. By aligning a knife along these two opposite marks (1*a*14) the user may divide the product into two equal halves; if the product is then sliced placing the knife between the two opposite vertical gaps (1*a*5) at the center of the guide walls, the product will be cut in quarters; finally, if the product is sliced from the edges of a guide-wall (1*a*7) to the opposite edges of the guide-wall in front (1*a*7) the product will end up divided in eight equal slices.

The tray (1A) may further include leading flanges (1*a*15) that configure the leading grooves (1*a*16) and locking flanges (1*a*17) that conform locking grooves (1*a*18). The leading grooves may serve to level the tray, assist with mounting it to the container, and rotate it. The locking grooves may provide stability, help to rotate and "lock" the tray in position. The lower flange of each pair (1*a*17) may include a raised feature (1*a*19) configured to engage a notch or groove (3*a*8) on the bottom side of the horizontal lock flanges (3*a*4) of the container, thereby locking the tray in place.

The tray's bottom horizontal flanges (1*a*15, 1*a*17) and grooves (1*a*16, 1*a*18) may perform several functions. They may provide stability when mounted on the container; they may be shaped with dual flanges that allow the horizontal flanges of the container to slide between them for attachment or removal; and they may also elevate the tray above any caramel or liquid collected at the bottom of the container.

In some embodiments, a ring-shaped lifter (1*a*10) may be provided at the top central portion of the guide-walls (1*a*2) to assist with lifting or lowering the tray inside the container.

A pair of vertical flanges configure the ergonomic rotators (1*a*11) and the gap between them (1*a*12). These flanges extend along the outer surface of the guide-walls, parallel to the central gap or space between them (1*a*5). These vertical flanges allow the user to hold the tray (1A) and rotate it to mount or dismount it to the container (3A). They may also house the ring's main flanges (2*a*2) and the container's vertical flanges (3*a*11) keeping all components in place.

Reinforcement structure (1*a*13) may also be included behind the guide-wall sections (1*a*4) and reinforcement structures (1*a*20, 1*a*21) may be included beneath the tray surfaces for structural rigidity. The interior circular wall of the container (3*a*2) may be divided into four arcs; two opposite shorter arcs (3*a*9) and two opposite longer arcs (3*a*10). The shorter arcs may correspond to sections for mounting and securing the tray to the container, and the larger arcs provide clearance for raising and lowering the tray in and out of the container.

In some embodiments the container's shorter arc sections (3*a*9) house locking flanges (3*a*4), connecting rail (3*a*5), rear flanges (3*a*6), end-stop features (3*a*7) and locking groove (3*a*8). In some embodiments the container's longer arc sections (3*a*10), provide space for lowering the tray to its bottom or raising it up to be locked or set apart. In some embodiments a vertical flange (3*a*11) may extend upward from the interior surface of the container to fit between the tray's rotating flanges (1*a*12), keeping the tray securely positioned in its bottom during storage or transportation. In some embodiments the container (3A) may store excess caramel or liquid at its base, and help stabilize the tray. The container's rim may include semicircular outward extensions (3*a*12) to allow access to the tray's lifters (1*a*10) and also serve as pouring spouts to serve caramel. The underside of the container may include a circular ridge (3*a*14) that enables it to stack on the lid (4A) of another identical container for efficient storage, refrigeration and transportation.

The ring (2A) may be generally cylindrical and may conform to the shape of the product. It may include opposite features (2*a*1) serving as lifters, and main (central) flanges (2*a*2) that insert into the vertical gaps (1*a*5) of the tray's guide walls (1*a*2) and the rotator's gap (1*a*12) to keep the ring (2A) and the product stable. Each central flange (2*a*2) may include at its bottom space (2*a*3) that allows clearance over the rim (1*a*6) of the guide-wall slot. Additional vertical auxiliary flanges (2*a*4) may align with the guide-walls sections (1*a*4) to reinforce stability during refrigeration and handling.

The lid (4A) may conform to the container's perimeter to provide a sealed closure that prevents contamination. The lid may include aid lifting wings (4*a*4) that work in combination with the container's (3*a*13) wing extensions to facilitate its removal. On its upper surface, the lid may include arc-shaped protrusions (4*a*1) designed to fit with the circular base of another container, enabling stable stacking. The spaces between protrusions may prevent pooling of residual liquid.

Disposable or Semi-Reusable Apparatus

In certain embodiments (see, e.g., FIG. 17-27), a disposable or semi-reusable system (B) (depending on the material used and its thickness) may include a tray 1B, a ring 2B, a container 3B, a lid 4B, and a plate 5B.

The flan is first cooked in a mold that shapes the custard portion. To demold and set up the product, the user releases the flan from the mold by loosening its edge with a knife. The user then confirms that plate 5B is secured to tray 1B and snaps tray 1B onto container 3A. Supporting the mold with one hand, the user places the attached components (the tray, plate, and container) upside down over the mold. Once the guide-walls (1*b*2) are aligned with the mold's rim, tray 1B is lowered. When the mold's upper rim reaches the plate's surface, the assembly is flipped so that the custard gently lowers or "drops" onto plate 5B.

During this maneuver, most caramel may spill into the container 3B over the plate's spillover retention rim (5*b*6), and a small amount may be retained to maintain the product's moisture and avoid it sticking to the plate. Once the flan rests on the plate 5B it may be sliced and served. Tray 1B may be detached from container 3B, set on a plate while the collected caramel inside the container 3B may be poured over individual slices as desired. If the product is only partially consumed, the ring 2B may be placed around it, the lid 4B snapped on top, and the assembly may be placed in refrigeration.

Tray and Plate (Disposable or Semi-Reusable)

In some embodiments, the tray 1B may be a thermoformed disc (e.g., which may be about 20.5 cm interior diameter) divided into four quadrants. Two opposite quadrants (1*b*3) may be slightly shorter than the other two (1*b*9) to compensate for knife thickness and assist in producing equal slices. Behind each shorter quadrant, a perpendicular guide-wall 1*b*2 (e.g., which may be about 5.3 cm tall, 0.1 cm thick) may rise and may comprise two sections (1*b*4) separated by a gap (1*b*5) The guide-walls (1*b*2) may assist in: (a) guiding and keeping in place the mold during demolding; (b) maintaining the ring 2B and product in position; and (c) guiding the user to cut same-size slices.

Each guide-wall section (1*b*4) may include pin-holes (1*b*8) (e.g., which may be about 0.3 cm diameter), positioned to match the plate's 5B snap-on pins (5*b*4) securing the plate to the tray, and help keeping the guide-wall sections (1*b*4) upright and aligned. The lower surface pattern (1*b*10) of the tray 1B may match the upper pattern of the container 3B to provide stable support. In some embodiments, two pairs of opposite snap-on features (1*b*11) on the tray 1B may engage corresponding receptacles (3*b*4) on the container 3B to secure both parts.

In some embodiments, plate 5B (see FIG. 23) may provide a flat circular surface (5*b*1) on which the flan or other product rests, and may be sliced. The plate may have at least two opposite arcs that configure the guide-wall sections (5*b*2) and two that configure the spillover sections (5*b*5).

The plate's guide-wall section arcs (5*b*2) can be configured by the wall-section rim 5*b*3 (e.g., which may be about 0.7 cm at its lowest) that avoid spillovers, and the snap-on pins (5*b*4) when assembled secure the plate to tray and hold up the tray's guide-wall sections (1*b*4). The plate's spillover arc sections (5*b*5) may include a retention rim 5*b*6 (e.g., which may be about 0.25 cm tall) that raises around both opposite spillover arcs (5*b*5). These rims allow excess of caramel or liquid to spill over into the container 3B while retaining a small amount of caramel surrounding the custard. Alignment indent marks (5*b*8) on the plate 5B may facilitate halving the flan; subsequent cut between guide-walls gaps (1*b*5) may yield quarters, and cuts from the sides of one guide-wall (1*b*6) the opposing side of the facing guide-wall (1*b*6) may yield eight equal slices.

Ring (Semi-Reusable or Disposable)

In some embodiments, the ring 2B (see FIG. 24) may be frusto-conical, open-ended, and hollow to conform to the external shape of the custard portion (e.g., which may be about 17.6 cm upper interior diameter, about 18.1 cm lower interior diameter). Opposite ergonomic lifters 2*b*1 (e.g., which may extend about 1.35 cm above the upper edge) may facilitate placement and removal. Two exterior main (central) vertical flanges 2*b*2 and four exterior auxiliary (lateral) vertical flanges 2*b*4 may stabilize the ring 2B and its product. The main flanges 2*b*2 may be arranged opposite each other and positioned 90° from the lifters 2*b*1; in use, the main flanges 2*b*2 may insert into the tray's guide-wall gap (1*b*5) to reduce wobble and sliding. The auxiliary flanges 2*b*4 may be positioned about 22.5° to either side of each primary flange 2*b*2 so that each auxiliary flange 2*b*4 aligns roughly with the center of a guide-wall section 1*b*4, further stabilizing the ring and product.

Container and Lid (Disposable)

In some embodiments, the container 3B may be a thermoformed disc (e.g., which may be about 24.06 cm interior diameter) having a peripheral rim (3*b*10) (e.g., which may be about 0.9 cm tall, ~1 cm wide at base). "U"-shaped ridges (3*b*6) may provide rigidity and serve as a caramel reservoir, while flat surfaces (3*b*3) between ridges may support the tray 1B attached to plate 5B. Two pairs of interlocking receptacles (3*b*4) may receive the tray's snap-on features (1*b*11) to secure the tray. These receptacles 3*b*4 may be aligned with drain/pour concavities 3*b*5 and plate spill sections 5*b*5 to facilitate caramel drainage into the container 3B during demolding and controlled pouring during serving.

In some embodiments, two opposite drain/pour concavities 3*b*5 (e.g., which may be about 2 cm long, 0.5 cm wide, 0.3 cm deep) may be formed along the inner lower peripheral border of the container's edge, generally at the center of the spill arc sections 3*b*2. When the tray 1B is removed, the concavities 3*b*5 may allow collected caramel to be poured out. Opposite wings 3*b*7 on the container exterior edge (e.g., which may be about 2.5 cm long, 1.5 cm wide) may cooperate with lid wings 4*b*6 to assist lid alignment, attaching and removal. A peripheral rim 3*b*10 of the container may mate with a corresponding peripheral groove on the lid 4*b*7 to form a seal that may help prevent spillage and odor ingress.

The edge of the peripheral rim (3*b*10) may have a couple of opposing protruding semicircles 3*b*8 that snap onto two concave semi-spheres of the lid keeping it attached to the container.

In some embodiments, the lid 4B (e.g., which may be about 26.66 cm exterior diameter, ~22.63 cm interior diameter, ~6.7 cm exterior height, ~5.45 cm interior height) may include stacking grooves 4*b*1 configured to match the bottom configuration of the container 3B, thereby allowing secure stacking. The ring's primary flanges 2*b*2 abut the flat interior wall surface (4*b*8) of the lid to help secure the ring during refrigeration and transport.

The lid's wings 4*b*6 in combination with the container's wings 3*b*7 serve to separate one from another. The press button 4*b*3 placed at the center upper side of the lid's bottom circular groove (4*b*7) is aligned at the center of the lid's wing 4*b*6 and serves, as mentioned before, to force the lid's semi-sphere concavity fixture 4*b*4 onto the container's protruding semi-sphere 3*b*8 securing lid 4B to container 3B.

The aligning marks 4*b*5 on the lid's side and over its circular bottom groove 4*b*7 may serve to align the lid with the container's wing aligning marks 3*b*7 and secure both together.

In some embodiments, the tray and plate may be permanently joined or integrally formed as a single molded component. The fused configuration may unite the tray and plate into a continuous structure. When molded as a single piece, the interface between the tray and plate may be eliminated, providing a simplified assembly, and enhanced fluid control by minimizing potential leakage paths between the two components. The integrally molded design may also maintain the relative positioning of the guide walls, spill sections, and snap-on features to ensure proper alignment with the container and restraining ring during use. The fused tray-plate unit may allow a low-cost production and reliable multi-use operation.

It will be understood that the foregoing description of various embodiments is illustrative only and is not intended to be limiting, as numerous modifications, variations, and alternative configurations of the disclosed subject matter may be made without departing from the scope of the present disclosure, and other embodiments will be apparent to those of ordinary skill in the art from consideration of the specification and practice of the disclosed apparatus and methods. Unless otherwise defined, all technical and scientific terms used herein have the same meaning as commonly understood by those skilled in the art to which this disclosure pertains, and the terminology used in the description of the embodiments is for the purpose of describing particular examples only and is not intended to be limiting. As used herein, the singular forms “a,” “an,” and “the” include the plural forms unless the context clearly indicates otherwise, and the terms “comprises,” “comprising,” “includes,” and “including” specify the presence of stated features, steps, or components but do not preclude the presence or addition of one or more other features, steps, components, or groups thereof.

What is claimed is:

1. An apparatus for demolding, slicing, serving, storing or transporting a food product comprising:

a tray or a plate, having at least one guide wall, where the guide wall is positioned on the perimeter of the tray or plate, where the tray or plate is sized to receive a solid component as well as a first portion of a liquid component of a food product; a restraining component sized to restrain the solid component of the food product, where the restraining component is ring shaped, the restraining component having at least one flange which can be used in conjunction with a guide wall of the tray or plate to restrict movement of the restraining component, where the restraining component can couple and decouple, to the tray or plate;

a container for receiving and containing a second portion of the liquid component of the food product; a lid, where the container and lid can be coupled together to enclose the tray or plate and restraining component, the container having at least one interlocking receptacle or an interlocking flange that can couple to the tray or plate.

2. The apparatus of claim 1 wherein said restraining element is annular and shaped to conform to exterior contours of the solid portion of the food product.

3. The apparatus of claim 1 wherein said tray or plate retains a first portion of said liquid component of the food product and said container retains a second portion of said liquid component of the food product, and said restraining component stabilizes the solid component of the food product.

4. The apparatus of claim 3, wherein the apparatus has at least a spill section.

5. The apparatus of claim 4 wherein said tray or plate includes guide-walls for positioning and guiding a cutting instrument for slicing the food product.

6. The apparatus of claim 5, wherein the tray and the plate are fused together to form a single integrated molded piece.

* * * * *